United States Patent
Knox et al.

(10) Patent No.: US 6,688,185 B2
(45) Date of Patent: Feb. 10, 2004

(54) SYSTEM AND METHOD FOR MICROSTRAIN MEASUREMENT

(75) Inventors: Matthew J. Knox, Romulus, MI (US); Joshua Forwerck, Troy, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/933,319

(22) Filed: Aug. 20, 2001

(65) Prior Publication Data

US 2003/0033885 A1 Feb. 20, 2003

(51) Int. Cl.⁷ .............................. G01L 1/22; G01L 1/04; G01B 7/16
(52) U.S. Cl. ............................ 73/862.045; 73/862.471; 73/862.338; 73/862.474; 73/768; 73/777
(58) Field of Search ......................... 73/777, 776, 775, 73/774, 767, 768, 862.045, 862.338, 862.471, 862.474, 862.627

(56) References Cited

U.S. PATENT DOCUMENTS

| | | | |
|---|---|---|---|
| 4,311,980 A | | 1/1982 | Prudenziati |
| 4,414,837 A | | 11/1983 | Bice et al. |
| 4,432,247 A | * | 2/1984 | Takeno et al. ......... 73/862.623 |
| 4,481,497 A | | 11/1984 | Kurtz et al. |
| 4,825,696 A | * | 5/1989 | Seipler ................. 73/514.33 |
| 4,932,265 A | | 6/1990 | Skuratovsky et al. |
| 5,222,398 A | * | 6/1993 | O'Brien ................ 73/862.632 |
| 5,539,158 A | * | 7/1996 | Utsunomiya et al. ....... 177/211 |
| 5,780,746 A | * | 7/1998 | Brady ..................... 73/766 |
| 5,894,301 A | | 4/1999 | Seffernick |
| 5,960,523 A | * | 10/1999 | Husby et al. .............. 24/633 |
| 6,003,380 A | | 12/1999 | Sasaki et al. |
| 6,169,479 B1 | * | 1/2001 | Boran et al. .............. 340/436 |

FOREIGN PATENT DOCUMENTS

JP  09135032 A * 5/1997 ........... H01L/29/84

* cited by examiner

Primary Examiner—Edward Lefkowitz
Assistant Examiner—Lilybett Martir
(74) Attorney, Agent, or Firm—James D. Erickson; Sally J. Brown

(57) ABSTRACT

A microstrain sensor is provided for measuring deformation, and indirectly, other parameters such as acceleration, temperature, pressure, and force. Rather than providing several discreet resistance paths, the microstrain sensor utilizes input and output conductors connected to a single piece of film through which current travels to indicate resistance. The film provides superior resistance to external effects, such as temperature gradients, that decrease the accuracy of the sensor's readings. Such sensors may be easily adapted for use in situations in which opposing stresses are present, such as dually constrained members, by disposing separate or unitary film sections on opposite sides of a zero stress point, such as a central plane of a fixed-guided beam. Such sensors may be utilized in many different applications, including automotive safety systems. The automotive safety system may utilize sensors to measure weight-in-seat, frame deformation, acceleration, seat belt tension, and other parameters in order to properly control safety elements of the vehicle such as seat belts and airbag systems. Such a sensor may be installed in a seat belt buckle to indicate the lath/unlatch characteristic of the seat belt, as well as the tension in the belt.

36 Claims, 10 Drawing Sheets

SYSTEM AND METHOD FOR MICROSTRAIN MEASUREMENT

BACKGROUND OF THE INVENTION

1. Field of the Invention

The present invention relates to sensors, and more specifically, to a microstrain sensor usable to measure deformation, acceleration, tension, and the like, in any application but particularly in the context of vehicle safety.

2. Description of Related Art

A control system is a system in which the operation of at least one device is to be controlled based on some parameter related to the system. In any control system, at least one sensor is utilized to gather data about a parameter of interest, and transform the data into a form readable by the system. Thus, any sensor is also a transducer. Typically, a sensor provides an electrical signal in which some characteristic such as the amplitude or frequency of the voltage varies in proportion to the parameter of interest. Such signals can be gathered from multiple sensors and processed by a computer to provide a control value for the device to be controlled.

One type of sensor is a strain gauge. A strain gauge is any sensor that deforms with an object to measure the object's strain, or deformation. The magnitude of the deformation can be useful in performing stress and structural analysis and the like, or for indirectly obtaining some other value of interest. For example, through manipulation of the strain gauge or the member on which the gauge is mounted, the strain gauge can be used to indirectly measure other parameters, such as the mass of an object attached to the member, the acceleration of the member, or the like.

Typically, strain gauges have one or more resistors for which the resistance changes according to the configuration of the resistor (i.e., a sensing resistor). Four total resistors are normally linked together in a diamond configuration to form a circuit known as the Wheatstone Bridge. The diamond configuration forms two separate current paths along which an input current can travel. A signal detector, such as an ammeter or voltmeter, straddles the two current paths so that current or voltage between the two paths can be measured. When resistance along one path increases, current can be expected to move through the signal detector to reach the other, lower-resistance path. Such an arrangement enhances the sensitivity of the sensor because the output signal is not proportional to the absolute resistance of the sensing resistor, but is proportional to the change in resistance between the current paths.

For example, in a quarter-bridge circuit, one of the four resistors may be a sensing resistor attached to the member in such a fashion that the resistor lengthens or shortens when the member deforms. The sensing resistor may take the form of a thin, meandering, conductive strip mounted to a thin piece of insulative plastic or ceramic. The sensing resistor may be attached to the beam by an adhesive. If vertical bending of a beam is to be measured, the sensing resistor may be affixed to the top or bottom surface of the beam so that the sensing resistor lengthens or shortens when the beam bends or relaxes.

The output voltage of the circuit may be measured to determine how far the sensing resistor is deflected. In the alternative, one of the other three resistors may be a variable resistor (i.e., a resistor with adjustable resistance). The resistance of the variable resistor may be adjusted until the bridge is balanced, i.e., the resistance change of the sensing resistor has been fully compensated for so that there is no output voltage. The resistance value of the variable resistor may then be read to determine by inference what the resistance of the sensing resistor must be.

Half-bridge and Full-bridge type circuits are also commonly used. A half-bridge circuit has two sensing resistors. The sensing resistors may be arranged in additive fashion, in which case they are both placed on the same side of the beam to receive the same deformation. If the sensing resistors are placed side-by-side, the effect is to negate the influence of lateral bending on the vertical bending measurement obtained by the sensor. The sensing resistors may alternatively be arranged in subtractive fashion and positioned on opposite sides of the beam (for example, one on the top side and one on the bottom side) so that the deformation they receive is opposite. The effect of such placement is to negate axial strain such as tension or compression along the length of the beam. In such a way, a half-bridge circuit can be used to remove undesirable strain effects from the pure vertical bending output of the sensor.

Full-bridge circuits typically have four sensing resistors that can be used to provide multiple compensation effects simultaneously. For example, two sensing resistors may be attached to the top side of the beam, and two may be placed on the bottom side of the beam. Thus, both lateral bending and axial strain can be filtered from the sensor output. In the alternative, all four sensing resistors can be placed on one side of the beam to provide increased compensation for lateral bending alone.

In all cases, the resistors used are separate and discreet. As a result, known strain gauges have a number of problems related to manufacture and installation. For example, despite the balancing effect of the bridge configuration, known strain gauges are subject to temperature variations that can cause inaccuracies in the sensor output. Due to the discreet nature of the resistors used, if a temperature gradient exists across the resistors, the temperature gradient may affect the output signal. Thus, the output signal will include variations unrelated to the parameter to be measured.

Similarly, mechanical damage to any of the resistors can occur. If, for example, one of the sensing resistors is scratched or plastically deformed through repeated loading, the resistance of the resistor may be artificially increased. The only crossover between the two current pathways is through the output signal detector. Consequently, when current shunts through the signal detector to reach the lower resistance current path, the sensor provides a false reading of the deformation of the member.

Furthermore, existing strain gauges are somewhat expensive and difficult to install. Each of the resistors must be made with some precision, or at least measured with accuracy, to ensure that the bridge is calibrated properly, or balanced at the appropriate deflection level. If the half-bridge or full-bridge configuration is to be used, each of the resistors must also be attached to the member at the proper orientation and respective location. In irregular or small members, it may be difficult to find adequate space for the sensing resistors. The resistors must also be connected in some way that will not interfere with the member or the sensor. Indeed, in many experiments involving strain gauges, simply attaching, connecting, and calibrating the sensing resistors often takes far more time than the actual testing.

Moreover, many strain gauges are ill-suited for applications in which opposing stresses are present in the same member. For example, if a beam is dually constrained, i.e., constrained at both ends, the simple bending stress distribution does not apply. A "fixed-guided" beam, or a beam with one cantilevered end, and another end constrained to remain perpendicular to the cantilevered end, will undergo opposing stresses simultaneously when a force is applied perpendicular to the guided end. More specifically, since the fixed-guided beam bends in an S-shape, the side of the beam toward the origin of the force will be in tension toward the cantilever attachment and in compression toward the guided attachment.

As a result, a normal strain gauge configured to measure tension will provide varying output depending on where the gauge is positioned along the length of the beam. If the strain gage were placed over the center of the beam, resistive elements of the strain gage may cancel each other because one side of the center is in tension and the other is in compression.

Consequently, a need exists for an enhanced strain sensor that would resist the distortion caused by temperature gradients and mechanical wear. Furthermore, a need exists for a strain sensor that would be simple and inexpensive to manufacture, particularly in larger quantities. Yet further, it would be an advancement in the art to provide a strain sensor that would be comparatively simple to install on a member. Moreover, it would be an advancement in the art to provide a strain sensor that would provide a predictable output that could be readily correlated to strain when attached to the center of a dually-constrained member. Such enhanced strain sensors could find application in a wide variety of control systems.

One example of a control system in which such an enhanced strain sensor would be especially helpful is an automotive safety system. Such a system may include several safety elements designed to protect passengers in the event of an accident, such as seat belts and airbags. During operation of the automobile, it is desirable to control a number of parameters of the safety elements, such as the degree of tension in the seat belts, the deployment or non-deployment of the airbags, the volume of inflation gases used to inflate the airbags if deployment occurs, and the length of time the airbags remain inflated.

These parameters should preferably be selected intelligently and not arbitrarily. Thus, the automotive safety system requires data concerning various characteristics of the vehicle and passengers. For example, the tension in the seat belt can provide information concerning whether the seat is occupied, how large the occupant is, whether the occupant is an adult or a child in a car seat, whether the occupant is leaning forward, and what pressure the seat belt is exerting on the occupant. The weight carried by a seat ("weight-in-seat") also can be used to detect the size of the occupant. The acceleration of the vehicle, including magnitude and direction, can be used to determine whether an accident is in progress or about to occur, and what the magnitude of the impact against the occupant will be.

The deformation of the vehicle frame can also indicate the severity of an accident, and thus, the impact force against the occupants. The velocity of the vehicle over time can also be used for impact measurement, or to determine the probable severity of potential future impacts. The pressure of various fluids could be measured to indicate the safety of the vehicle after an accident has occurred; for example, the pressure of gas in the gas tank could indicate whether a fuel leak has occurred. The temperature inside the vehicle could also be used as an indicator of fire in the passenger compartment of the vehicle.

Through the use of the appropriate sensors, decisions regarding seat belt tension, airbag inflation, and the like may be made more accurately and with greater confidence. Vehicle occupants will be better protected by an automotive safety system that receives accurate data and interprets the data intelligently.

Accordingly, a need exists for an automotive safety system equipped with sensors that function accurately and reliably over the comparatively long life of a vehicle. Such an automotive safety system should preferably be inexpensive to manufacture and comparatively simple to install. Furthermore, such an automotive safety system should preferably receive all the data necessary to ensure that safety elements are utilized to afford the maximum possible protection to occupants of the vehicle.

SUMMARY OF THE INVENTION

The apparatus of the present invention has been developed in response to the present state of the art, and in particular, in response to the problems and needs in the art that have not yet been fully solved by currently available sensors. Thus, it is an overall objective of the present invention to provide a sensor that overcomes the problems of the prior art, and is particularly amenable to use in automotive safety systems.

To achieve the foregoing objects, and in accordance with the invention as embodied and broadly described herein in the preferred embodiment, a microstrain sensor is provided. In selected embodiments, the microstrain sensor provides functionality similar to that of a full-bridge Wheatstone Bridge circuit without the use of discreet resistors. Rather, a single expanse of film is used to conduct electric current between a plurality of conductors, preferably four, in contact with the film. The conductors may be arrayed about the film in a rectangular or diamond configuration to provide self-balancing effects similar to those of the conventional full bridge strain gauge. The conductors and film may rest on a comparatively thin insulator affixed to a deformable member, the deformation of which is to be measured.

Thus, for example, two input conductors may be positioned on opposite sides of a current-carrying portion of the film and connected to an input signal source. Two output conductors may also be positioned on opposite sides of the current-carrying portion, displaced from the input conductors. Thus, two separate conduction paths are created between the input conductors. The output conductors may be connected to an output signal detector, such as an ammeter, to detect current flow between the two conduction paths.

Such a configuration provides several benefits over conventional strain gauges using discreet resistors. In operation, the film provides a considerable current-carrying cross section, so that current can circumnavigate any scratches or other irregularities in the film that may otherwise detract from the accuracy of the sensor. The continuous array of potential current pathways assures that thermal affects and other potential unbalancing factors are mitigated. If the resistance of one portion of a conductive path is artificially raised, current can shunt around the irregularity without diverting to the other conductive path.

Additionally, although the relative placement of the conductors is important, the film must simply overlap all of the conductors such that a straight path between each of the conductors is provided. The film should preferably be a uniform thickness. However, if the film extends further on one side than on another, the operation of the sensor is not affected. Preferably, the film takes the form of a "thick film"

applied through a relatively rapid and simple process such as screening. The film may easily and inexpensively be applied, and the microstrain sensor may be installed in a very small space.

The microstrain sensor may take a wide variety of different configurations depending on the parameter to be measured. For example, the conductors may be placed side-by-side in a rectangular or square configuration on the deformable member to measure axial strain of the deformable member, such as may be caused by simple stretching, compression, or bending. In the alternative, the conductors may be arrayed in a diamond orientation on the deformable member to measure torsion, or tension/compression along an axis rotated 45 degrees from the longitudinal axis of the deformable member.

If acceleration is to be measured, the conductors may be arrayed to measure axial strain as described above. One end of the deformable member may then be affixed to a movable object, and the other end may be left free. Thus, acceleration of the object perpendicular to the film induces bending of the deformable member that is read by the microstrain sensor. A weight may be attached to the free end of the microstrain sensor to increase the gain, or sensitivity, of the microstrain sensor. Other desired parameters such as pressure and temperature could be similarly measured using the microstrain sensor, by arranging the deformable member in the proper fashion.

If strain of a dually constrained deformable member is to be measured, the microstrain sensor may be reconfigured somewhat. More specifically, the microstrain sensor may have a plurality of film sections positioned on either side of a central plane that divides the deformable member in half. The film sections may be joined to form a unitary film portion that crosses the central plane. The unitary film portion may then have a pair of input conductors disposed on either side of the central plane, and an output conductor between the input conductors. The portion of the input signal that reaches the output conductor then indicates the strain of the dually constrained deformable member.

Since the two film sections are on opposite sides of the central plane, one will be in tension while the other is in compression. Hence, the resistance of one will increase while the resistance of the other decreases. The positioning of the output conductor between the input conductors makes the opposing resistance changes have an additive effect on the output signal, rather than negating each other. Since there are two effective resistors, the resulting circuit is a half bridge.

Two such unitary film portions may be used to provide a full bridge configuration to yield greater output signal amplitude, temperature correction, or other benefits. Crossover circuitry may be used to connect opposite ends of the unitary film portions so that the two unitary film portions produce a combined, additive output signal.

The accuracy of any of the previously described microstrain sensors may possibly be enhanced by ordering the manufacturing steps such that a substantially uniform thickness of film is provided. For example, an insulator may first be applied on a deformable member to create a substantially flat, uniform surface on which the film can be placed. The film may be formed on the insulator with a substantially uniform thickness. The conductors may then be disposed on top of the film and attached in a way that does not significantly deform the film. Hence, a comparatively uniform resistance change may occur along the length of the film when the film is elongated or shortened.

An automotive safety system could beneficially use strain gauge sensors, and more particularly, the microstrain sensor of the invention, to enhance the safety of occupants of the vehicle. For example, microstrain sensors could be used to measure acceleration, deformation of the vehicle frame, the weight of the occupant, and tension on the seat belt.

Acceleration could be measured, for example, by affixing accelerometers incorporating the microstrain sensor, as described above, to the vehicle. The accelerometers could be affixed at multiple orientations to measure acceleration in multiple dimensions. Deformation of the frame could be measured by affixing microstrain sensors to the frame to measure axial or torsional strain in the frame. The weight of the occupant could be measured by affixing a microstrain sensor at one or more locations on the undercarriage of the occupant's seat. Deformation of the undercarriage will occur in proportion to the occupant's weight.

Tension in the seat belt could be measured in a number of ways. For example, a microstrain sensor could be affixed to some rigid portion of the seat belt, such as the latch plate, anchor plate, or buckle. In one embodiment, the buckle contains a microstrain sensor configured to detect the seat belt tension as well as the latched/unlatched status of the buckle assembly. The microstrain sensor may be affixed to a deformable member in the form of a leaf spring within the buckle. The buckle may have a lever arm that operates to hold the latch plate within the buckle, and to bend the leaf spring when the buckle is latched, thereby increasing the deformation read by the microstrain sensor to indicate the latched state of the buckle assembly.

When there is tension in the seat belt assembly, the latch plate pulls on the lever arm to cause elastic bending. The bending of the lever arm causes the lever arm to contact the leaf spring at a point further toward the free end of the leaf spring so that the deformation of the leaf spring is decreased. That deformation change can be read by the microstrain sensor to indicate that the seat belt tension has increased.

The microstrain sensors may all be connected to a single processing unit that processes the sensor data to determine the appropriate response of the safety elements of the safety system, such as the airbag system and the seat belt. Control wires may extend from the processing unit to the various safety elements of the vehicle. Thus, the operation of the safety elements can be optimized in response to the parameters received through the microstrain sensors.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 10, is not intended to limit the scope of the invention, as claimed, but is merely representative of presently preferred embodiments of the invention.

The present invention provides new systems and methods for the microstrain measurement, or the measurement of small-scale deformation. By providing a continuous expanse of shunting paths for electric current, the microstrain sensor of the present invention can provide a more accurate and robust strain measurement with built-in balancing effects. Additionally, the microstrain sensor can be installed and operated in a comparatively small space.

Additionally, the present invention provides an automotive safety system through which the operation of safety elements of a vehicle can be carried out more intelligently. A control system is only as good as the data provided to it. Consequently, the better the data provided to the automotive safety system, the more effective the safety system will be in protecting the occupants of the vehicle from physical harm. The microstrain sensor of the present invention may be utilized in a number of different ways within a vehicle to provide the maximum of amount of data for the automotive safety system. The microstrain sensor and some of its potential uses within the automotive safety system will be further described as follows.

Figure 1:
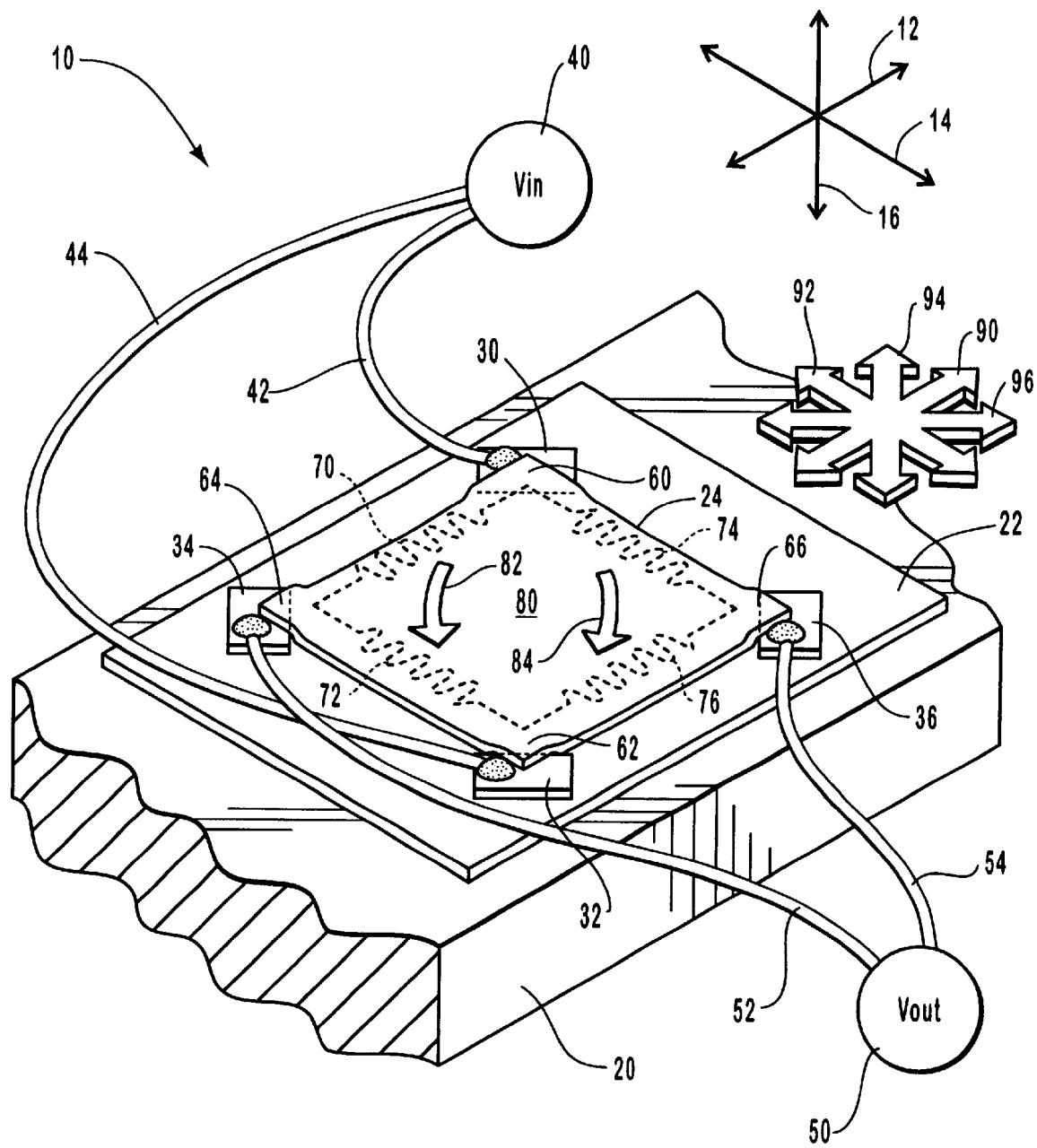
FIG. 1 is a perspective view of one embodiment of a microstrain sensor according to the present invention, positioned to measure axial strain in a generalized deformable member.

Referring to FIG. 1, one embodiment of a microstrain sensor 10 according to the invention is depicted. The microstrain sensor 10 may have a longitudinal direction 12, a lateral direction 14, and a transverse direction 16. As shown, the microstrain sensor 10 is affixed to a generalized deformable member 20. The deformable member 20 may take any form, and must simply have a small, somewhat flat surface upon which the microstrain sensor 10 can be mounted. The surface need not be precisely flat, but may be gently curved in one or two directions. Thus, the deformable member 20 may be a shaft or spherical object, as long as the curvature is not excessive. The deformable member 20 may be deformed (i.e., bent, stretched, compressed, twisted, and the like) into a plurality of configurations; the deformable member 20 may be made of any solid material.

The microstrain sensor 10 may have an insulator affixed directly to the deformable member 20 through the use of an adhesive or the like. The insulator 22 is preferably a thin layer of nonconductive material, such as a ceramic, polymer, or elastomer. A film 24 may be applied directly to the insulator 22. The film 24 is preferably a thick film, which may, for example, consist of an ink such as a carbon/glass composite. However, the film 24 may be constructed of a wide variety of substances, and may be made in many ways. Silver, or a carbon/silver mix could, for example, also be used to construct the film 24. The film 24 may have a thickness on the order of 0.5 millimeters.

The material of the film 24 may be screen printed onto the insulator 22 and fired to a temperature of about 720° to glaze the film 24 so that it will conduct electricity properly. Such a process offers numerous advantages over those used to create other film configurations, such as thin film. Thin films are typically deposited in a more time-consuming process, through the use of more complex equipment. Thus, thick film is preferred for the film 24. However, other types of film such as thin film may also be used.

The film 24 provides variable resistance to current passage because as the film 24 elongates, the current path through the film 24 lengthens. The grains of the film 24 separate somewhat from each other on a microscopic level, thereby increasing the size of the gap through which electrons must travel to navigate the film 24. The resistance change is substantially discreet across perpendicular directions. Thus, elongation in the longitudinal direction 12 would have little impact on resistance against current traveling through the film 24 in the lateral direction 14.

Preferably, a plurality of conductors are connected to the film 24 to transmit an input signal through the film 24 and receive an output signal corresponding to the configuration of the film 24. More specifically, a positive input conductor 30 and a negative input conductor 32 may be attached at opposite sides of the film 24. Similarly, a first output conductor 34 and a second output conductor 36 may be attached at opposite sides of the film 24, rotationally offset from the input conductors 30, 32. Preferably, the conductors 30, 32, 34, 36 are accurately positioned with respect to each other so that they are separated by a known distance.

As shown, the conductors 30, 32, 34, 36 have been attached to the insulator 22 prior to application of the film 24. However, the conductors 30, 32, 34, 36 may be affixed on top of the film 24, if desired. Installing the conductors 30, 32, 34, 36 prior to application of the film 24 may improve the adhesion of the conductors 30, 32, 34, 36 to the insulator 22, and may also make accurate positioning of the conductors 30, 32, 34, 36 easier. The degree to which the film 24 overlaps the conductors 30, 32, 34, 36 is substantially immaterial, so long as there is adequate electrical contact between the conductors 30, 32, 34, 36 and the film 24.

The input conductors 30, 32 may be connected to an input signal source 40 by a positive input wire 42 and a negative input wire 44, respectively. The input signal source 40 preferably provides a steady, known voltage to the input conductors 30, 32. The output conductors 34, 36 may similarly be connected to an output signal detector 50 by a first output wire 52 and a second output wire 54, respectively. The signal detector 50 receives the output signal and measures its strength. The signal detector 50 may, for example, take the form of a voltmeter configured to measure the voltage received by the output conductors 34, 36.

A positive input node 60 and a negative input node 62 are defined as regions of the film 24 to which the positive input conductor 30 and the negative input conductor 32 are connected, respectively. The input nodes 60 are therefore regions of the film in which the input signal is received. Similarly, first and second output nodes 64, 66 are regions of the film 24 to which the output conductors 34, 36 are attached, respectively. The output signal exits the film 24 through the output nodes 64, 66.

The microstrain sensor 10 may be relatively easily modeled as a circuit. As shown in FIG. 1, a first equivalent resistor 70 is located between the positive input conductor 30 and the first output conductor 34. A second equivalent resistor 72 is located between the first output conductor 34 and the negative input conductor 32. A third equivalent resistor 74 is located between the positive input conductor 30 and the second output conductor 36. A fourth equivalent resistor 76 is located between the second output conductor 36 and the negative input conductor 32.

The equivalent resistors 70, 72, 74, 76 are not discreet resistors within the film 24; rather, the equivalent resistors 70, 72, 74, 76 represent paths current could take through the film 24 between the conductors 30, 32, 34, 36. The resistance of the equivalent resistors 70, 72, 74, 76 is provided by the film 24 itself. A current-carrying portion 80 of the film 24 may be defined as the region within the conductors 30, 32, 34, 36; regions of the film 24 lying outside the conductors 30, 32, 34, 36 do not carry significant current because the input signal is applied across the current-carrying portion 80. If the conductors 30, 32, 34, 36 are spaced apart evenly, such as in a square configuration, and the film 24 has a uniform thickness, the resistances of the equivalent resistors 70, 72, 74, 76 will be substantially the same.

The equivalent resistors 70, 72, 74, 76 form a rectangular shape between the conductors 30, 32, 34, 36 that will be recognized by those of skill in the art as a Wheatstone bridge circuit. Since all of the equivalent resistors 70, 72, 74, 76 change in resistance depending on the configuration of the film 24, the equivalent resistors 70, 72, 74, 76 form a full-bridge configuration. The first and second equivalent resistors 70, 72 form a first conduction path 82 from the positive input conductor 30 to the negative input conductor 32. Similarly, the third and fourth equivalent resistors 74, 76 form a second conduction path 84 from the positive input conductor 30 to the negative input conductor 32.

Generally, when the first and second conduction paths 82, 84 have the same resistance, equal amounts of current will flow through both conduction paths 82, 84. The current through the output signal detector 50 is then zero because the bridge is balanced. When the resistances of the conduction paths 82, 84 are not equal, however, current will move across the output conductors 34, 36 to reach the lower-resistance conduction path of the conduction paths 82, 84. The output signal detector 50 will then detect the strength of the signal moving between the conduction paths 82, 84.

Generally, the first and fourth equivalent resistors 70, 76 influence the output signal in the same direction, while the second and third equivalent resistors 72, 74 both influence the output signal in a direction opposite from that of the first and fourth equivalent resistors 70, 76. Thus, when the first and fourth equivalent resistors 70, 76 increase in resistance, i.e., the film 24 is elongated in the longitudinal direction 12, the output signal generated changes accordingly. On the other hand, if the first and second equivalent resistors 70, 72 were to change in resistance by the same proportion, their effects would cancel each other so that there would be little or no change in the output signal. Consequently, the microstrain sensor 10 is sensitive to elongation in certain directions but not in others.

A longitudinal axis 90 of the deformable member 22 may be defined as the axis along the length of the deformable member 22 (along longitudinal direction 12). A lateral axis 92 of the deformable member 22 similarly lies along the lateral direction 14. A first torsional axis 94 and a second torsional axis 96 are in plane with the longitudinal axis 90 and the lateral axis 92 (i.e., within the plane formed by the longitudinal and lateral directions 12, 14), but are rotationally offset by 45° from the longitudinal axis 90 and the lateral axis 92.

Torsion is force tending to twist the deformable member 20; strain resulting from such twisting motion generally occurs at an axis 45° rotated from the longitudinal axis of the deformable member 20. Thus, if torsion is applied tending to twist the deformable member 20 about the longitudinal axis 90, the resulting strain will be along the first torsional axis 94 or the second torsional axis 96, depending on the direction of the torsional force.

In the orientation depicted in FIG. 1, the microstrain sensor 10 senses strain, or deformation, along the longitudinal axis 90 or the lateral axis 92, such as may be caused by direct tension or compression along the longitudinal axis 90 or the lateral axis 92, or by bending force tending to curve the deformable member 20 around the longitudinal axis 90 or the lateral axis 92. Bending causes compression of the interior surface and tension of the exterior surface, and therefore produces a strain somewhat like that of direct axial tension or compression.

For example, when the deformable member 20 elongates along the longitudinal axis 90, the positive input conductor 30 and the second output conductor 36 move away from the negative input conductor 32 and the first output conductor 34. Consequently, the film 24 elongates, and the resistances of the first equivalent resistor 70 and the fourth equivalent resistor 76 are increased. The resistances of the second and third equivalent resistors 72, 74 do not increase because there is no elongation along the lateral axis 92; on the contrary, there may be some contraction of the deformable member 20 along the lateral axis 92 due to the strain along the longitudinal axis 90. Such contraction is known in the art and is based on Poisson's Ratio, a property of the material of the deformable member 20.

As stated above, resistance changes to the first and fourth equivalent resistors 70, 76 have an additive effect on the output signal. Consequently, with the microstrain sensor 10 oriented as in FIG. 1, the output signal changes in response to strain along the longitudinal axis 90. Similarly, strain along the lateral axis 92 would be shown by the output signal because the second and third equivalent resistors 72, 74 have an additive effect.

However, if the equivalent resistors 70, 72, 74, 76 all have the same resistance, as in the embodiment depicted in FIG. 1, the microstrain sensor 10 produces little or no change in the output signal in response to uniform strain along both the longitudinal axis 90 and the lateral axis 92. Thus, if the deformable member 20 were to be stretched such that the percent change in length along the longitudinal axis 90 is equal to the percent change in length along the lateral axis 92, the resistance increase of the first and fourth equivalent resistors 70, 76 would cancel that of the second and third equivalent resistors 72, 74 to produce a net change of zero in the output signal.

Similarly, if there is strain only along the first torsional axis 94 or along the second torsional axis 96, the resistances of the equivalent resistors 70, 72, 74, 76 will change substantially uniformly so that there is no change in the output signal. As a result, the microstrain sensor 10, as oriented in FIG. 1, is well suited to measuring strain along the longitudinal axis 90 or the lateral axis 92, but incapable of measuring strain along the first or second torsional axes 94, 96. However, the microstrain sensor 10 can easily be reconfigured to provide measurement of torsional strain.

The microstrain sensor 10 may be referred to as a novel type of strain gauge. Like known strain gauges, the microstrain sensor 10 measures deformation. However, the microstrain sensor 10 accomplishes the deformation measurement through the use of a comparatively simple film/conductor arrangement, in place of the plurality of discreet resistors relied upon by known strain gauges. Thus, a "microstrain sensor" may defined as a special type of strain gauge that measures deformation by providing an input signal through a single resistive member, and receiving a corresponding output signal from the member, in such a manner that the balancing effects of the Wheatstone Bridge are obtained.

Figure 2:
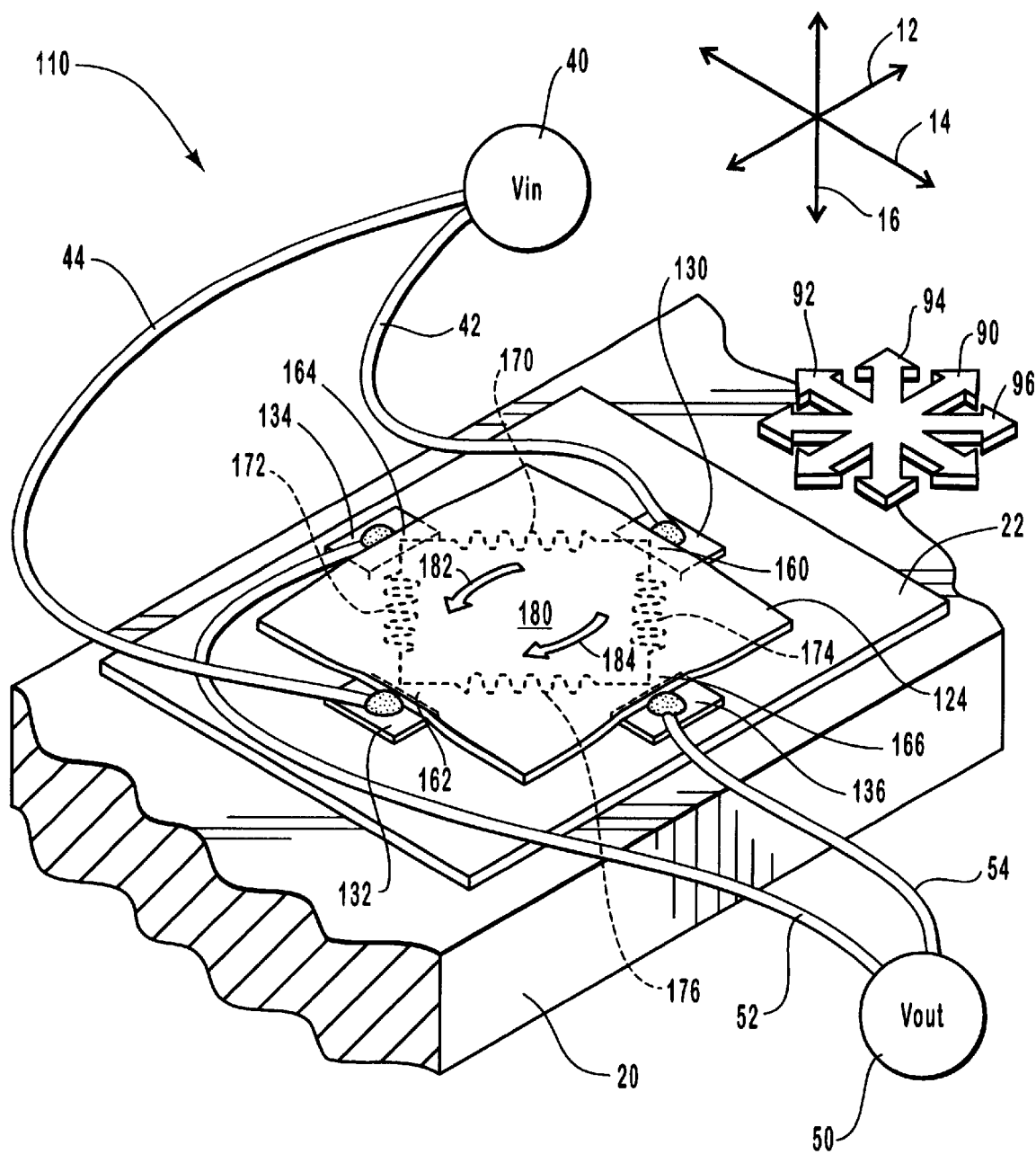
FIG. 2 is a perspective view of an alternative embodiment of a microstrain sensor according to the present invention, positioned to measure torsional strain in a generalized deformable member.

Referring to FIG. 2, an alternative embodiment of a microstrain sensor 110 according to the invention is depicted. The microstrain sensor 110 of FIG. 2 is adapted for measuring strain along the first and second torsional axes 94, 96. However, the microstrain sensor 110 does not effectively measure strain along the longitudinal axis 90 or the lateral axis 92.

Once again, an insulator 22 is attached to the deformable member 20. A film 124 is applied over the insulator, and may have substantially the same configuration as the film 24 of the configuration of FIG. 1. However, the conductors 130, 132, 134, 136 of the configuration of FIG. 2 are positioned differently from the conductors 30, 32, 34, 36 of FIG. 1. More specifically, positive and negative input conductors 130, 132 are fixed at the same position in the lateral direction 14, so that the input signal is applied generally along the longitudinal direction 12. Similarly, first and second output conductors 134, 136 are fixed at the same position in the longitudinal direction 12.

Corresponding positive and negative input nodes 160, 162 therefore exist where the positive and negative input conductors 130, 132 contact the film 124. Correspondingly, first and second output nodes 164, 166 exist where the first and second output conductors 134, 136 contact the film 124. A first equivalent resistor 170 is located between the positive input conductor 130 and the first output conductor 134. A second equivalent resistor 172 is located between the first output conductor 134 and the negative input conductor 132. A third equivalent resistor 174 is located between the positive input conductor 130 and the second output conductor 136. A fourth equivalent resistor 176 is located between the second output conductor 136 and the negative input conductor 132.

A current carrying portion 180 of the film 124 has a first conduction path 182 and a second conduction path 184. The first conduction path 182 runs from the positive input conductor 130 to the first output conductor 134, and from the first output conductor 134 to the negative input conductor 132. The second conduction path 184 runs from the positive input conductor 130 to the second output conductor 136, and from the second output conductor 136 to the negative input conductor 132.

The equivalent resistors 170, 172, 174, 176 of FIG. 2 are located parallel and perpendicular to the first and second torsional axes 94, 96. Thus, torsional strain will change the resistance of the equivalent resistors parallel to the direction of the strain, while leaving the perpendicular equivalent resistors substantially unchanged. For example, elongation of the deformable member 20 along the first torsional axis 94 would draw the positive input conductor 130 and the first output conductor 134 away from the first output conductor 132 and the second output conductor 136. As a result, the resistance of the second and third equivalent resistors 172, 174 would increase.

As with the configuration of FIG. 1, the second and third resistors 172, 174 have an additive effect on the output signal, so the output signal would change to indicate the torsional strain. Elongation along the first torsional axis 94 may decrease the resistance of the first and second equivalent resistors 170, 176 somewhat, but would not cause any resistance increase that would offset the resistance increase of the second and third equivalent resistors 172, 174.

Similarly, elongation along the second torsional axis 96 would increase the resistance of the first and fourth equivalent resistors 170, 176 without providing an offsetting increase in the resistance of the second and third equivalent resistors 170 176. However, equal strain in the first and second torsional directions 94, 96 would tend to uniformly increase the resistances of all of the equivalent resistors 170, 172, 174, 176, thereby producing no change in the output signal.

In the configuration of FIG. 2, the equivalent resistors 170, 172, 174, 176 are rotated 45° from the equivalent resistors 70, 72, 74, 76 of FIG. 1. In FIG. 2, this has been accomplished by leaving the film 124 in the same orientation as the film 24 of FIG. 1, and positioning the conductors 130, 132, 134, 136 at the centers of each side of the film 124, rather than at the corners. However, only the relative positions of the conductors 130, 132, 134, 136 is important; whether they are mounted at the corners of the film 124 or the sides is immaterial. Indeed, as mentioned previously, as long as the film 124 provides sufficient contact with each conductor 130, 132, 134, 136 and relatively straight and uniform current paths exist between the conductors 130, 132, 134, 136, the film 124 can have nearly any configuration.

The microstrain sensors 10, 110 measure resistance directly, and through the measurement of resistance, obtain a deformation measurement. The deformation measurement can, in turn, be used to obtain a wide variety of other parameters of interest such as acceleration, pressure, temperature, and the like.

Figure 3:
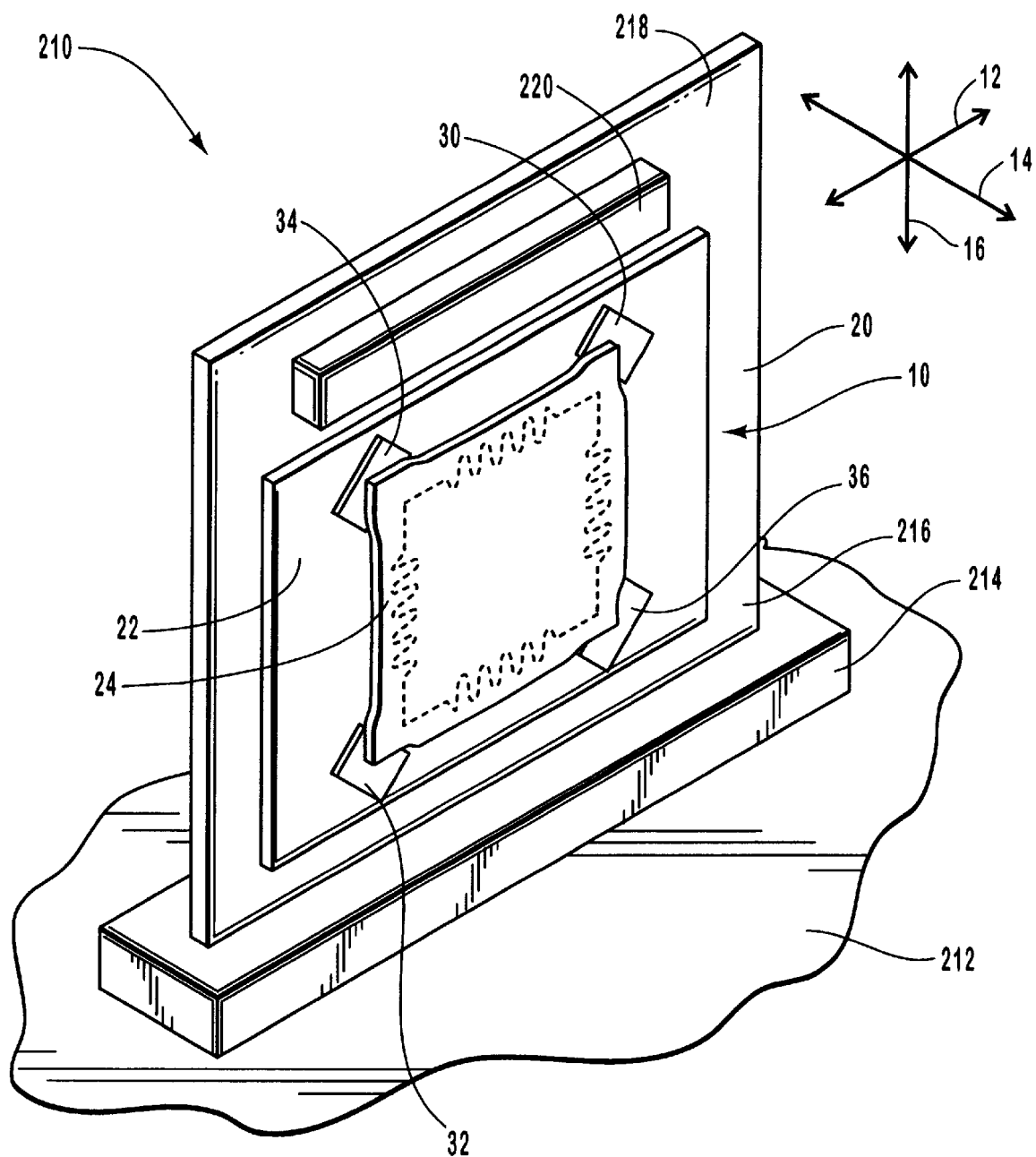
FIG. 3 is a perspective view of an accelerometer incorporating the microstrain sensor of the present invention.

Referring to FIG. 3, one embodiment of an accelerometer 210 incorporating a microstrain sensor 10 like that of FIG. 1 is depicted. The accelerometer 210 is oriented to measure acceleration in the transverse direction 16, i.e., perpendicular to the microstrain sensor 10. The accelerometer 210 is mounted on a surface 212, the acceleration of which is to be measured. Thus, the surface 212 may be an interior surface of a vehicle or the like. A base 214 is configured to grip the deformable member 20 in cantilevered fashion. As a result, a first end 216 of the deformable member 20 is held by the base 214, and a second end 218 is unrestrained.

Preferably, the deformable member 10 is somewhat thin so that measurable bending of the deformable member 10 will occur as the surface 212 moves in the transverse direction 16. The microstrain sensor 10 is quite sensitive, so a relatively small amount of bending is sufficient. If desired, a weight 220 may be affixed to the second end 218 of the deformable member 20 to increase the amount of bending that occurs in the deformable member 20. Because bending occurs in proportion to the acceleration of the surface 212, the output signal of the microstrain sensor 10 is proportional to the acceleration of the surface 212. The microstrain sensor 10 of FIG. 1 is used because bending is to be measured, as opposed to torsional strain.

The accelerometer 210 could be reconfigured in a wide variety of ways to enhance or adapt its operation. For example, the accelerometer could be oriented perpendicular to the longitudinal direction 12 to measure longitudinal acceleration, or oriented perpendicular to the lateral direction 14 to measure lateral acceleration. Multiple accelerometers 210 could be used in different orientations to provide multi-dimensional acceleration measurement.

The accelerometer 210 could also be utilized to measure vibration, which is simply a repetitive form of acceleration. If desired, the motion second end 218 with respect to the surface 212 could be damped to avoid "ringing," wobbling of the deformable member as the surface 212 goes through some sudden acceleration. For example, the second end 218 could be immersed in a high-viscosity fluid.

Figures 4, 4A:
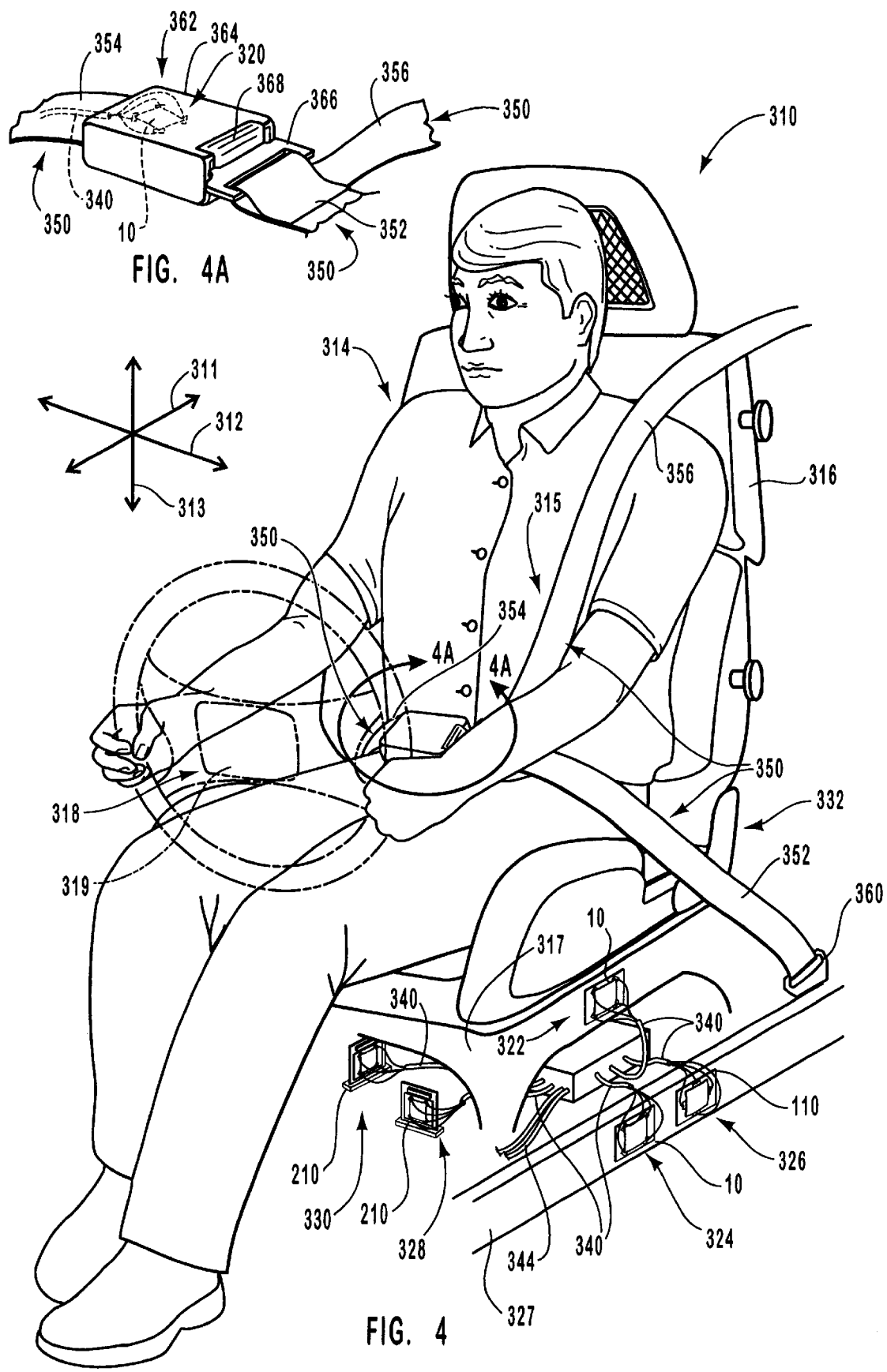
FIG. 4 is a perspective view of an automotive safety system incorporating microstrain sensors to enhance the protection of an occupant of the vehicle.

Referring to FIG. 4, the microstrain sensors 10, 110 and accelerometers 210 are shown in use with an automotive safety system 310. The automotive safety system 310 may have a longitudinal direction 311, a lateral direction 312, and a transverse direction 313. The automotive safety system is designed to sense the operating environment of a vehicle, a portion of which is depicted in FIG. 4, to enhance the safety of an occupant 314 of the vehicle.

The automotive safety system may include any number of safety elements; however, FIG. 4 depicts a seat belt 315 designed to hold the occupant 314 within a seat 316. The seat 316 may be supported by an undercarriage 317. The seat belt 315 shown is a combined lap belt/shoulder harness type; however, the seat belt 315 may have any known configuration. Additionally, FIG. 4 depicts an airbag system 318 including an airbag 319 installed to protect the occupant 314 from impact in the longitudinal direction 313. Other airbags (not shown) such as knee bolsters, inflatable curtains, and the like may also be used as part of the automotive safety system 310 to provide more comprehensive protection.

The operation of the safety elements, or the seat belt 315 and airbag 319, may be modified in various ways to enhance the protection they provide for the occupant 314. For example, the seat belt 315 may be tensioned more or less tightly, depending on the severity of a crash or other factors, by a tensioning mechanism (not shown) within the vehicle. If desired, the seat belt 315 could be made to automatically unlatch in certain circumstances, such as a fire or gas leak in the vehicle.

The airbag 319 could be set to deploy if the occupant 314 is an adult or larger child, but not if the occupant 314 is a small child in a car seat. Furthermore, the airbag 139 could inflate more rapidly and fully in the case of a more severe impact. The time during which the airbag remains inflated could also be modified; for example, an inflatable curtain cushion designed to protect against side impact could be configured to remain inflated for only a very short period of time under simple side impact, but to stay inflated for several seconds in the event of a more prolonged accident, such as a vehicle rollover.

All of the operational variables described above depend on the status of the vehicle. Consequently, a number of sensors 320, 322, 324, 326, 328, 330 may beneficially be installed throughout the vehicle to gather data so that the safety elements 315, 319 can be more effectively controlled. The sensors 320, 322, 324, 326, 328, 330 may be of any known type. However, strain gauges may be beneficially used to obtain many of the desired parameters. Furthermore, the strain gauges preferably take the form of microstrain sensors, like those depicted in FIGS. 1 and 2. The sensors 320, 322, 324, 326, 328, 330 may thus be affixed to various parts of a vehicle, each of which acts as the deformable member 20 of FIGS. 1 and 2.

More specifically, a sensor 320 may be configured to measure tension of the seat belt 315, and may take the form of a microstrain sensor 10 oriented to measure longitudinal or lateral strain. The configuration and operation of the sensor 320 will be described and depicted in greater detail subsequently. The tension in the seat belt 315 is a helpful parameter because the tension is proportional to the force exerted by the seat belt 315 against the occupant 314. It is desirable that the seat belt 315 provide firm restraint, without pressing hard enough to cause discomfort or injury. If desired, the seat belt 315 may be configured to give way somewhat during impact, either through stretching or through slippage of a retention mechanism, to ensure that the force exerted by the seat belt 315 against the occupant 314 is always within acceptable levels.

The tension in the seat belt 315 is also helpful because it indicates whether the seat belt 315 has been used to anchor a car seat for a child on the seat 316. When a car seat is anchored on the seat 316, the adult will typically loop the seat belt 315 through the frame or some other portion of the car seat and tighten the seat belt 315 to hold the car seat securely. Thus, a seat belt tension measurement that is continually high probably indicates that the occupant of the seat 316 is in a car seat. Accordingly, the automotive safety system 310 may not signal the airbag 319 to inflate, even if an accident occurs, because children in car seats can be injured by inflating airbags.

A sensor 322 may be configured to measure the weight of the occupant 314 within the seat 316, or "weight-in-seat." The sensor 322, the seat 316, and the undercarriage 317 may collectively be referred to as a seat assembly 332. The sensor 322 may also be a microstrain sensor 10, and may be positioned at some location on the undercarriage 317 of the seat 316 (not necessarily the position depicted in FIG. 4). When the occupant 314 sits in the seat 316, some small amount of compression of the undercarriage 317 will occur. Although this compression is too small for the naked eye to discern, the sensitivity of the microstrain sensor 10 enables the sensor 322 to measure the weight of the occupant 314 based on that compression.

The sensor 322 may be attached to directly measure compression (shortening) of a member of the undercarriage, or may be attached to measure bending. In the alternative, a microstrain sensor 110 could be used to measure torsional force against a member. Since the occupant 314 is likely to sit in the center of the seat 316, compression of the undercarriage 317 may be somewhat uniform. Thus, only one sensor 322 may be required to determine weight-in-seat. However, additional microstrain sensors 10, 110 may be positioned at various locations on the undercarriage 317 to take into account the fact that the occupant 314 may be sitting toward one side of the seat 316, or may be leaning forward or backward so that the compression of various portions of the undercarriage 317 is different.

Sensors 324, 326 may be affixed to a portion of the frame 327 of the vehicle. The sensors 324, 326 indicate the amount of deformation in the frame 327. The deformation of the frame 327 may, for example, be a good indicator of the severity of the crash; a more severe crash will produce a higher degree of elastic or plastic deformation in the frame 327. The sensors 324, 326 need not be positioned underneath the occupant 314, as depicted, but could be positioned at any suitable location on the frame. Placement on the front and rear of the vehicle may provide a more advanced and direct warning of crash severity.

FIG. 4 depicts the use of two sensors 324, 326. The sensor 324 is shown as a microstrain sensor 10, configured to measure longitudinal, lateral, and bending strain. The sensor 326 is shown as a microstrain sensor 110, configured to measure torsional strain. The sensors 324, 326 may be used in concert as shown to provide a more complete analysis of the deformation of the frame 327. The frame 327 probably will not experience simple tension, compression, bending, or torsion, but will instead be subject to some combination thereof, particularly in an accident. However, if desired, only a single sensor 324 or 326 maybe used.

Sensors 328, 330 may each take the form of accelerometers 210, as depicted in FIG. 3, and may be used to measure the acceleration of the vehicle. As shown, the sensor 228 is oriented perpendicular to the longitudinal direction 311. Thus, the sensor 228 measures acceleration in the longitudinal direction 311. If the vehicle undergoes a direct, head-on impact or an impact from behind, such an impact would cause sudden acceleration of the vehicle. Such acceleration is measured by the sensor 228. If the vehicle undergoes acceleration in the lateral direction 312, as when the vehicle rolls over or is struck from the side, the lateral acceleration would be measured by the sensor 330.

Each of the sensors 320, 322, 324, 326, 328, 330 may have a sensor wire 340 to convey the sensor output to a processing unit 342 positioned at a safe location in the vehicle. The sensors 320, 322, 324, 326, 328, 330 may each be independent, if desired, and may be complete with a dedicated input signal source and output signal detector. The sensor wires 340 may then transmit the output signal, or some modified version of the output signal, to the processing unit 342. In the alternative, the processing unit 342 may contain input signal sources and output signal detectors for each of the sensors 320, 322, 324, 326, 328, 330. The sensor wires 340 may thus convey the input signals to each of the sensors 320, 322, 324, 326, 328, 330, and convey the unmodified output signals back to the processing unit 342.

The processing unit 342 may contain the necessary electronics to read and interpret the output signals. Thus, the processing unit 342 may have some type of processor, such as a microprocessor, digital signal processor, ASIC (application specific integrated circuit), FPGA (field programmable gate array), or the like. Additionally the processing unit 342 may contain memory, analog-to-digital converters, digital-to-analog converters, and other necessary electronics. Preferably, the processing unit 342 contains logical algorithms that determine the optimal control parameters for each of the safety elements 315, 319 based on the output signals. One or more control wires 344 may extend from the processing unit 342 to convey operating instructions to the various safety elements 315, 319 of the vehicle.

The seat belt 315 may be of any known type, but preferably has a plurality of belt members 350 configured to restrain the occupant 314 within the seat 316. The seat belt 315 may have a first lap belt member 352 and a second lap belt member 354, as well as a shoulder belt member 356 connected to the first lap belt member 352. The first lap belt member 352 may be pivotally or rigidly affixed to the vehicle by a first anchor plate 360. The second lap belt member 354 may have a corresponding second anchor plate (not shown).

The first and second lap belt members 352, 354 may be connected by a seat belt buckle assembly 362, which includes a buckle 364 and a latch plate 366 configured to slide into and lock within the buckle 364. The buckle may have a button 368 that can be pressed to release the latch plate 366 from the buckle 364, thereby permitting disengagement of the first and second lap belt members 352, 354.

The sensor 320 may be located at a variety of positions in the seat belt 315 besides the seat belt buckle assembly 362. For example, the latch plate 366, first anchor plate 360, or second anchor plate could act as the deformable member 20 of FIG. 1. The sensor 320 could thus be attached directly to the latch plate 366, the first anchor plate 360, or the second anchor plate to directly measure elongation therein. The sensor 320 could then be covered by cover (not shown) to protect the sensor 320 from external damage or influence. Since the latch plate 366, the first anchor plate 360, and the second anchor plate would all be expected to elongate in proportion to the tension in the seat belt 315, such a configuration of the sensor 320 would provide an accurate measurement of seat belt tension.

However, the sensor 320 is preferably located within the seat belt buckle assembly 362. From such a location, the sensor 320 can be used to indicate whether the seat belt 315 is latched, i.e., whether the latch plate 366 is secured within the buckle 364, in addition to the tension in the seat belt 315. Such a configuration will be shown and described in greater detail in connection with FIGS. 5 and 6.

Figure 5:
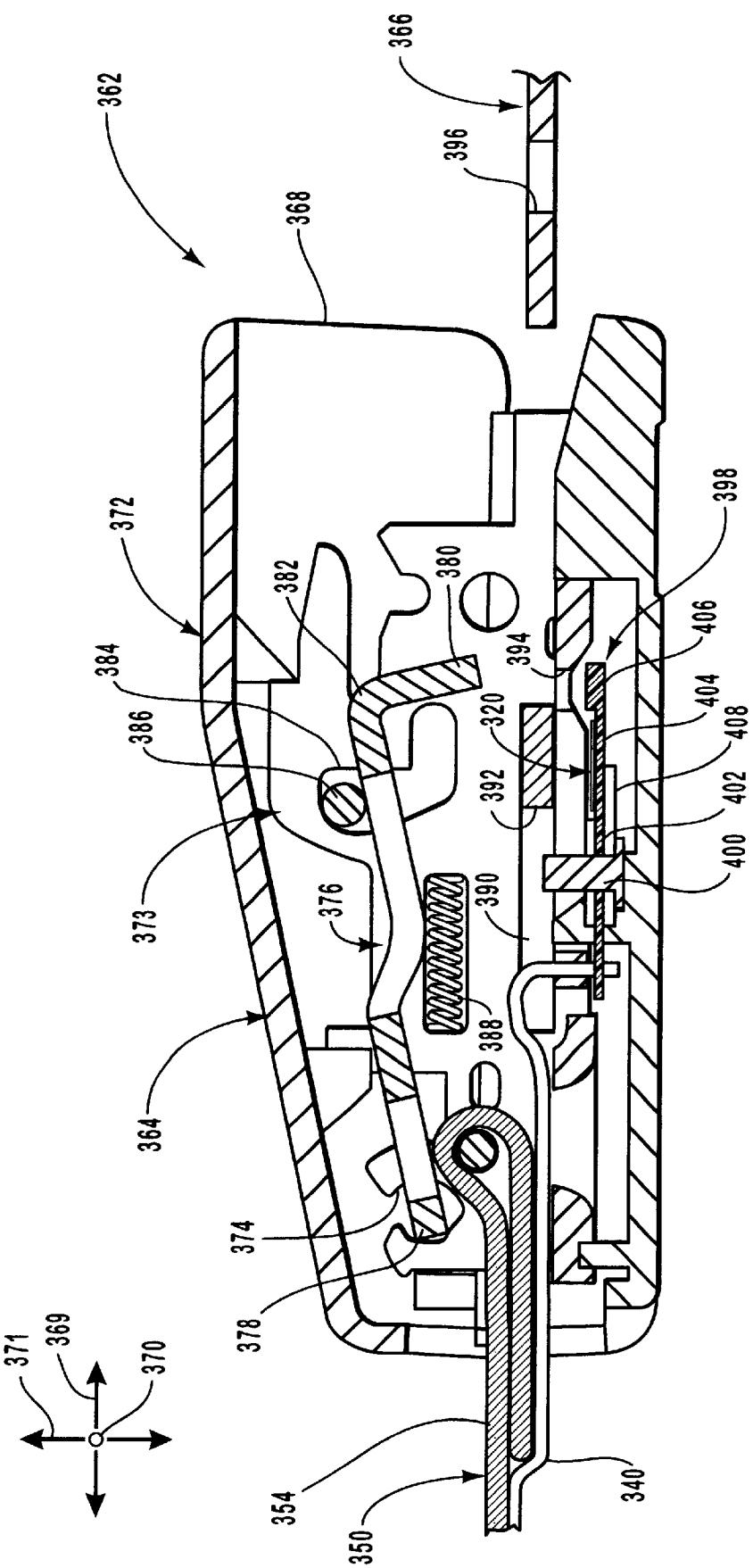
FIG. 5 is a side section view of the belt buckle assembly of FIG. 4 including a microstrain sensor configured to detect the latch/unlatch status of the buckle assembly as well as the tension on the seat belt, with the buckle assembly in the unlatched configuration.

Referring to FIG. 5, one embodiment of a seat belt buckle assembly 362 incorporating the sensor 320 is depicted. The seat belt buckle assembly 362 is shown in the unlatched configuration, with the latch plate 366 disengaged from the buckle 364. Although the sensor 320 could be incorporated into a wide variety of known seat belt buckles, one exemplary buckle type is depicted in FIG. 5. The seat belt buckle assembly 362 may have a longitudinal direction 369, a lateral direction 370, and a transverse direction 371. The buckle 364 may also have a housing 372 containing a bracket 373 with several features necessary for operation of the buckle 372.

The bracket 373 may have a receiving slot 374 configured to pivotally restrain a lever arm 376 within the housing 372. The lever arm 376 may have a proximal end 378 held within the receiving slot 374, a contact portion 380 opposite the proximal end 378, and a bend 382 that causes the contact portion 380 to extend at an angle substantially perpendicular to the remainder of the lever arm 376. The bracket 373 may also have a slot 384 with an L-shape in which a latching pin 386 moves in contact with the lever arm 376 to keep the lever arm 376 in place when the seat belt buckle assembly 362 is in the latched configuration.

A spring 388 may be connected to the lever arm 376 to keep the lever arm upraised, as shown, to permit the latch plate 366 to enter and exit the buckle 364. The bracket 373 may have a slot 390 containing an ejector driver 392 operatively connected to the spring 388 to release the tension on the spring from the lever arm 376. The housing 372 may have a hole 394 sized and positioned such that the contact portion 380 can pivot to enter the hole 394. The latch plate 366 may have a corresponding opening 396 sized to receive the contact portion 380 of the lever arm 376.

The seat belt buckle assembly 362 may be latched by pressing the latch plate 366 into the housing 372. The latch plate 366 abuts the ejector driver 392 and causes the ejector driver 392 to slide through the slot 390 to release the spring 388, thereby permitting the lever arm 376 to pivot. The contact portion 380 of the lever arm 376 swings through the opening 396 of the latch plate 366 and into the hole 394 of the housing 372. Thus, the lever arm 382 interferes with motion of the latch plate 366 out of the buckle 364.

Once the lever arm 376 has pivoted into a locking position, the latching pin 386 may travel along the slot 384 to keep the lever arm 376 from pivoting out of the locking position. The latch plate 366 cannot then be removed from the buckle 364 without pressing the button 368 to move the latching pin 386 through the slot 384 so that the lever arm 376 is able to pivot to remove the contact portion 380 from the opening 396. When the button 368 is pushed, the ejector driver 392 is also driven by the spring 388 to propel the latch plate 366 out of the buckle 364.

Underneath the hole 394 of the housing 372, a deformable member 398 in the form of a leaf spring 398 may be affixed to the housing 372 through the use of a fastener 400, which may take the form of a screw, rivet, press fit post, or the like. The leaf spring 398 is preferably made of a metallic material such as steel. As shown, the leaf spring 398 has a proximal portion 402 fixed in cantilevered fashion by the fastener 400, an intermediate portion 404, and a distal portion 406. The terms "proximal portion," "intermediate portion," and "distal portion" refer not to absolute terminal ends or center points of the leaf spring 398, but to general areas of the leaf spring 398.

The distal portion 406 is unrestrained so that the leaf spring 398 can be deflected by moving the distal portion 406 toward or away from the hole 394 of the housing 372. However, the leaf spring 398 may be supported by a backing member 408 directly adjoining the leaf spring 398 and attached to the housing 372 in cantilevered fashion by the fastener 400. The backing member 408 may serve to increase the bending of the intermediate portion 404 of the leaf spring 398.

The sensor 320, which preferably takes the form of a strain gauge, and more preferably takes the form of the microstrain sensor 10, is affixed to the intermediate portion 404 of the leaf spring 398. As mentioned above, the microstrain sensor 10 is oriented to measure longitudinal strain, lateral strain, or bending. Thus, the microstrain sensor 10 provides an output signal proportional to the degree of bending in the intermediate portion 404 of the leaf spring 398. The output signal is transmitted from the sensor 320 to the sensor wire 340, which may be attached to or embedded in the second lap belt member 354. The bending of the leaf spring 398 indicates the latch/unlatch status of the seat belt buckle assembly 362 and the tension in the seat belt 315, as will be further described in connection with FIG. 6.

Figure 6:
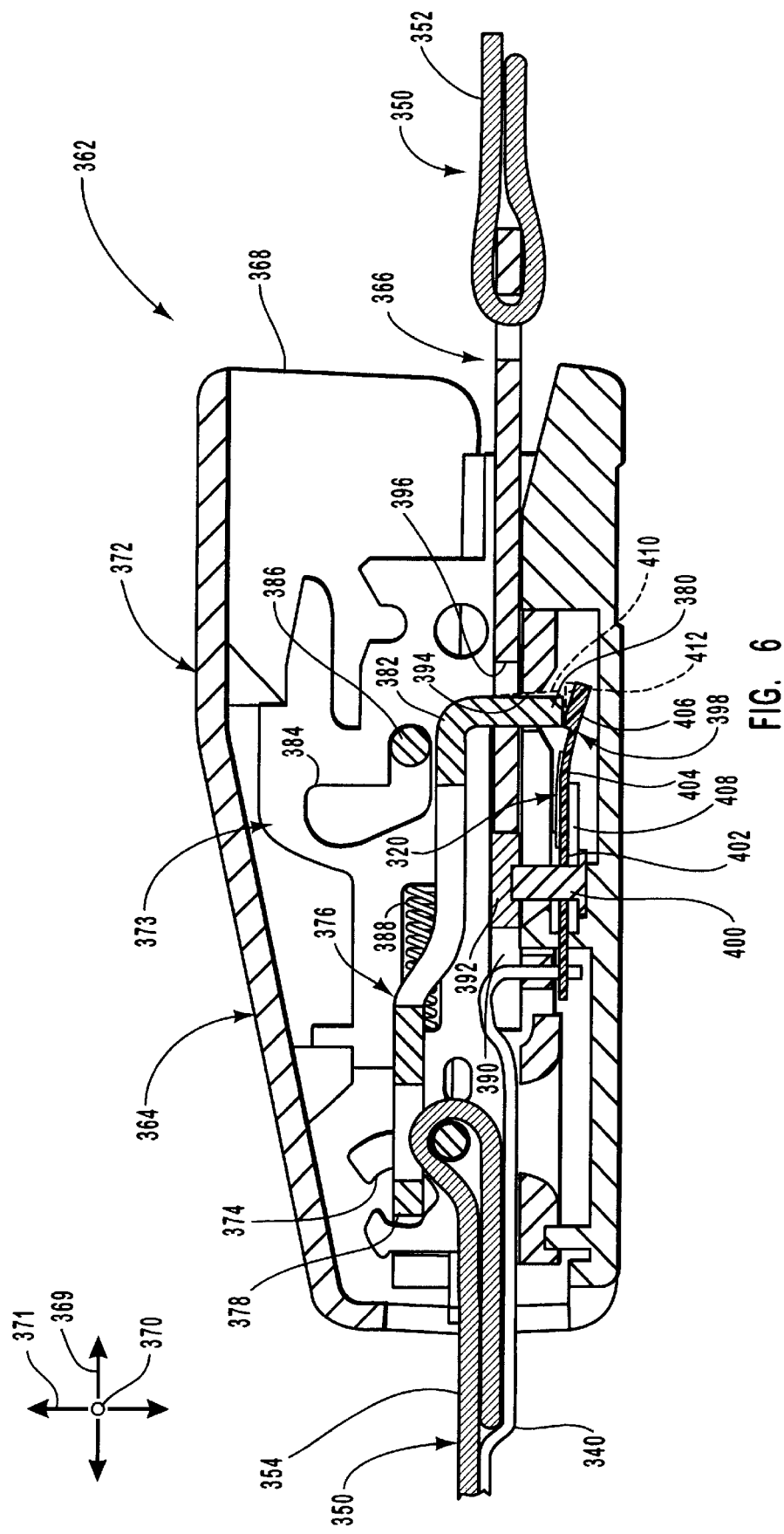
FIG. 6 is a side section view of the belt buckle assembly of FIG. 5 with the buckle assembly in the latched position, depicting possible deformation of a lever arm of the buckle to indicate tension on the seat belt.

Referring to FIG. 6, the seat belt buckle assembly 362 is depicted in the latched condition, i.e., with the latch plate 366 engaged within the buckle 364. The lever arm 376 extends through the hole 394 of the housing 372 and the opening 396 of the latch plate 366 so that the contact portion 380 contacts the distal portion 406 of the leaf spring 398. The distal portion 406 is pressed by the contact portion 380 so that the leaf spring 398 is bent into a deflected configuration. The sensor 320 reads the bending and generates a corresponding output signal to indicate that the seat belt buckle assembly 362 is in the latched state. The latch/unlatch data may affect operation of the airbag 319, or may simply be used to control a chime or other device to warn the occupant 314 that the seat belt 315 has not been fastened.

When the seat belt 315 is tight around the occupant 314, the result is that tension is applied to the seat belt buckle assembly 362. The tension acts in the longitudinal direction 369 to withdraw the latch plate 366 from the buckle 364. This tension is transmitted through the latch plate 366 to the lever arm 376, which is pulled and slightly deformed by the latch plate 366 under tension. More specifically, the contact portion 380 is bent in the longitudinal direction 369 away from the fastener 400; the bend 382 increases somewhat in radius as the contact portion 380 pivots outward. The contact portion 380 reaches a deflected position 410, shown in phantom in FIG. 6.

When the contact portion 380 moves to the deflected position 410, the contact portion 380 touches the distal portion 406 of the leaf spring 398 at a point longitudinally further from the proximal portion of the leaf spring 398 and the fastener 400. The contact portion 380 has moved longitudinally, but little motion has occurred in the transverse direction 371. Since the contact portion 380 makes contact further out on the leaf spring 398, the leaf spring 398 relaxes to a less deflected configuration 412. The sensor 320 reads the relaxation in the leaf spring 398 and changes the output signal accordingly.

The further the output signal moves toward the signal obtained when the seat belt buckle assembly 362 is unlatched, the greater the tension in the seat belt 315. Consequently, the latch/unlatch state and the tension of the seat belt 315 can both be provided through the use of a single sensor 320 and a single output signal.

The microstrain sensors 10, 110 may be used for a wide variety of applications, only a few of which are described in the preceding paragraphs. However, if strain of a deformable member with opposing stresses is to be measured, other configurations may be more appropriate. Through proper positioning of sections of the film used to provide variable resistance, microstrain sensors may be configured such that opposing strains have an additive effect on sensor output. Examples of such microstrain sensor configurations will be shown and described in greater detail in connection with FIGS. 7 through 10.

Figure 7:
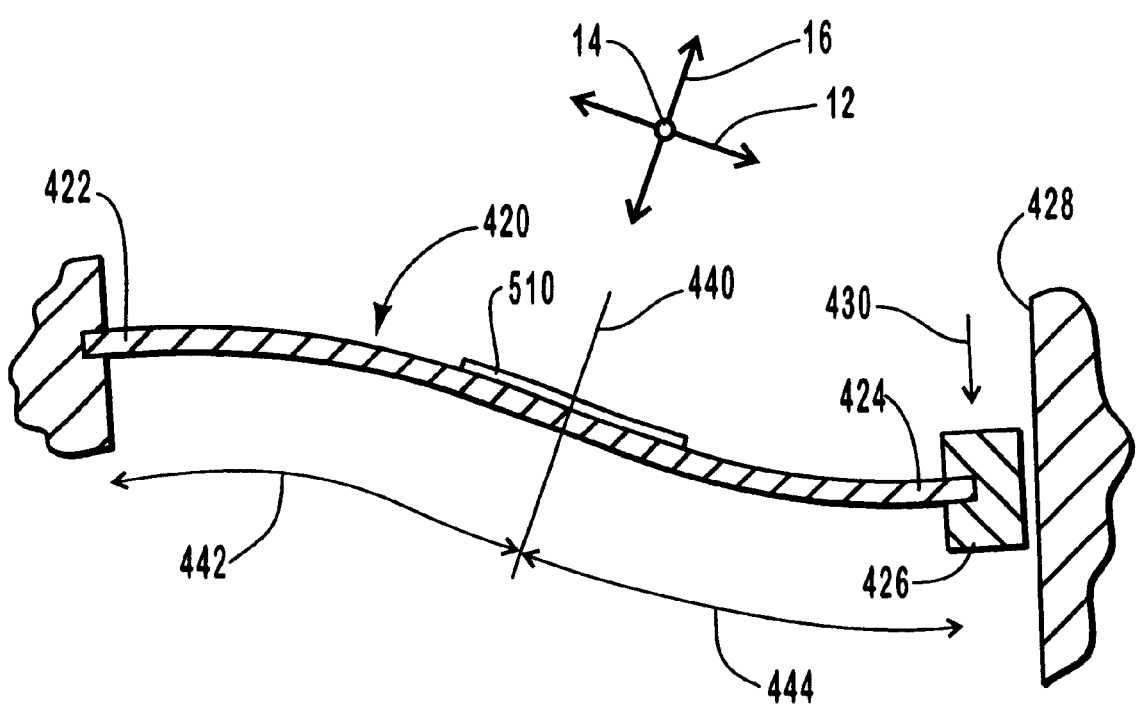
FIG. 7 is a side section view of a dually constrained deformable member bisected by a central plane, with a microstrain sensor configured to measure strain in an environment in which opposing stresses are present.

Referring to FIG. 7, a side section view of a dually constrained deformable member 420, or deformable member 420, is depicted. The dually constrained deformable member 420 provides one example of a situation in which opposing stresses, and therefore opposing strains, are present in the same member simultaneously. The deformable member 420 may have a first end 422 and a second end 424. The first end 422 may be fixed in place in cantilevered fashion, i.e., such that the first end 422 is unable to translate or pivot. The second end 424 may be "guided," or fixtured such that the second end 424 is able to move perpendicular to the deformable member 420 in general, but is unable to pivot.

The guided attachment is depicted by a sliding block 426, to which the second end 424 is affixed in cantilevered fashion, and a surface 428. The sliding block 426 may be constrained to remain in contact with the surface 428, or may be capable of moving toward the first end 422; however, the sliding block 426 is unable to rotate. Hence, when a force 430 is applied in a direction perpendicular to the second end 424, the second end 424 remains substantially parallel to the first end 422. As a result, the deformable member 420 deflects with an "S" shape, as shown in FIG. 7.

The deformable member 420 may be bisected by a central plane 440, which is not physical but is simply an analytical tool that will be used to describe the strains present in the deformable member 420. The central plane 440 is depicted as a line in FIG. 7 because an edge view of the plane 440 is shown. The central plane 440 may divide the deformable member 420 into a first half 442 and a second half 444. The first and second halves 442, 444 may be substantially equal in length.

As a result of the S-shaped bending of the deformable member 420, the first half 442 has a strain pattern substantially opposite that of the second half 444. More specifically, the side of the deformable member 420 that faces the force 430, or the top, according to the viewpoint of FIG. 7, will be in tension along the first half 442, but in compression along the second half 444. The strains may be largest near the first and second ends 422, 424, and may gradually decrease to zero at the central plane 440 to make the transition between tension and compression.

A microstrain sensor 510 may attached at a central location of the deformable member 420, such that the microstrain sensor 510 passes through the central plane 440. In the absence of some unique configuration, a strain gauge positioned like the microstrain sensor 510 may provide a null output since a portion of the strain gage would be in tension, and a portion would be in compression. This problem is remedied by the microstrain sensor 510 in a manner that will be shown and described in connection with FIG. 8.

Figure 8:
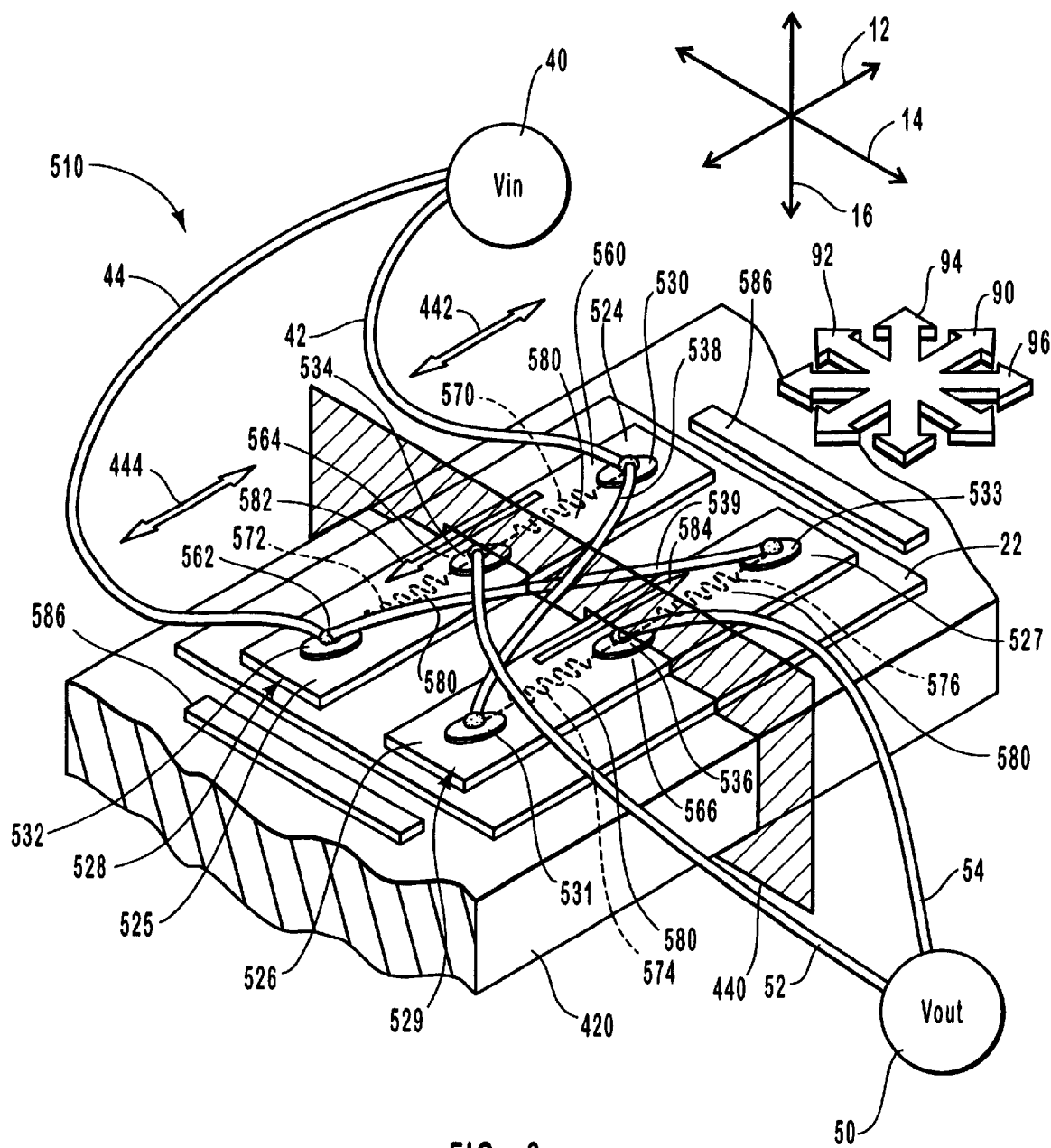
FIG. 8 is a perspective view of a the microstrain sensor of FIG. 7, attached at the central plane of the dually constrained deformable member.

Referring to FIG. 8, a perspective view of a portion of the deformable member 420 is depicted, including the microstrain sensor 510. The central plane 440 is shown for reference. The microstrain sensor 510 may have an insulator 22 similar to that of the previous figures. A first film section 524 and a second film section 525 may be formed on the insulator through a process such as screening. Like the films 24, 124 described previously, the film sections 524, 525 may be made of a thick film.

The first and second film sections 524, 525 may be disposed on opposite sides of the central plane 440 so that one of the film sections 524, 525 will be in tension while the other is in compression. In a manner that will be described in greater detail subsequently, the first and second film sections 524, 525 serve as two resistors to provide a half-bridge strain element; thus, the two film sections 524, 525 may alone form the basis for a functional microstrain sensor. However, a full bridge design may provide enhanced gain (output signal amplitude), temperature compensation, and/or other benefits. Consequently, a third film section 526 and a fourth film section 527 are provided so that the microstrain sensor 510 has a full-bridge design.

The third film section 526 may be positioned beside the second film section 525, and the fourth film section 527 may be positioned beside the first film section 524 and opposite the third film section 526. Hence, the first and fourth film sections 524, 527 may be positioned on the first half 442, while the second and third film sections 525, 526 are positioned on the second half 444.

The first and second film sections 524, 525 may be joined to form a first unitary film portion 528 passing through the central plane 440; similarly, the third and fourth film sections 526, 527 may be joined to form a second unitary film portion 529 parallel to the first unitary film portion 528. According to other embodiments, the film sections 524, 525 and the film sections 526, 527 need not be joined together, but may instead be separate and may be electrically coupled. Such an embodiment will be shown and described in connection with FIG. 10.

The first unitary film portion 528 may have a positive input conductor 530, which may be electrically coupled to a positive intermediate conductor 531 of the second unitary film portion 529. Similarly, the first unitary film portion 528 may have a negative input conductor 532, which may be electrically coupled to a negative intermediate conductor 533. A first output conductor 534 may be positioned between the input conductors 530, 532, and a second output conductor 536 may be positioned between the intermediate conductors 531, 533. Each of the conductors 530, 531, 532, 533, 534, 536 shown in FIG. 8 has a generally cylindrical shape; however, rectangles, round shapes, flat-sided shapes, or the like may also be used.

The input conductors 530, 532 may be positioned equidistant from the central plane 440 and from the first output conductor 534, so that the first output conductor 534 is located at the central plane 440, or at the center of the deformable member 420. The intermediate conductors 531, 533 may similarly be positioned equidistant from the central plane 440 and from the second output conductor 536, so that the second output conductor 536 is also located at the central plane 440. Consequently, strain of the deformable member 420 is substantially zero in the vicinity of the output conductors 534, 536. However, the strain increases in one direction toward the positive input conductor 530 and the negative intermediate conductor 533, and in the opposite direction toward the negative input conductor 532 and the positive intermediate conductor 531.

In illustration of FIG. 8, the positive input conductor 530 and the positive intermediate conductor 531 are electrically coupled by a positive crossover wire 538. Similarly, the negative input conductor 532 and the negative intermediate conductor 533 are electrically coupled by a negative crossover wire 539. However, the crossover wires 538, 539 are shown simply to illustrate which of the conductors 530, 531, 532, 533 are electrically coupled; actual electrical coupling may be carried out in a number of different ways, one of which will be shown and described in connection with FIG. 9.

As with the embodiments previously described, the positive input conductor 530 and the negative input conductor 532 may be electrically coupled to an input signal source 40 through the use of a positive input wire 42 and a negative input wire 44, respectively. Similarly, the negative input conductor 534 and the second output conductor 536 may be electrically coupled to an output signal detector 50 through the use of a first output wire 52 and a second output wire 54. Like the crossover wires 538, 539, the wires 42, 44, 52, 54 are present in FIG. 8 to show the layout of the electric circuit formed by the microstrain sensor 510; actual electrical coupling may be carried out through other structures besides wires.

Like the microstrain sensors 10, 110 of FIGS. 1 and 2, the unitary film portions 528, 529 of the microstrain sensor 510 may have a positive input node 560 near the positive input conductor 530, a negative input node 562 near the negative input conductor 532, a first output node 564 near the first output conductor 534, and a second output node 566 near the second output conductor 536. The nodes 560, 562, 564, 566 may form endpoints of current pathways through the unitary film portions 528, 529. Consequently, the film sections 524, 525, 526, 527 may have a plurality of equivalent resistors 570, 572, 574, 576, each of which is disposed in a current carrying portion 580 of the film sections 524, 525, 526, 527.

More specifically, the first film section 524 may have a first equivalent resistor 570 between the positive input conductor 530 and the first output conductor 534. The second film section 525 may have a second equivalent resistor 572 between the negative input conductor 532 and the first output conductor 534. The third film section 526 may have a third equivalent resistor 574 between the positive intermediate conductor 531 and the second output conductor 536. The fourth film section 527 may have a fourth equivalent resistor 576 between the negative intermediate conductor 533 and the second output conductor 536.

The equivalent resistors 570, 572, 574, 576, like those of FIGS. 1 and 2, simply represent the resistances of the film sections 524, 525, 526, 527. When one of the film sections 524, 525, 526, or 527 is under tension, elongation of the film occurs, and the resistance of the corresponding equivalent resistor 570, 572, 574, or 576, respectively, increases. Similarly, compression results in a decrease in the resistance of the corresponding equivalent resistor 570, 572, 574, or 576.

Like the microstrain sensors 10, 110 of FIGS. 1 and 2, the microstrain sensor 510 provides multiple conduction paths for electric current traveling from the positive input conductor 530 to the negative input conductor 532. More specifically, a first conduction path 582, as indicated by an arrow in FIG. 8, may lie along the first unitary film portion 528. Current traveling through the first conduction path 582 may move from the positive input conductor 530 through the first equivalent resistor 570, the first output conductor 534, and the second equivalent resistor 572 to reach the negative input conductor 532.

A second conduction path 584, also indicated by an arrow in FIG. 8, may lie along the second unitary film portion 529. Current traveling through the second conduction path 584 may move from the positive input conductor 530 through the positive crossover wire 538 to reach the first intermediate conductor 531. From the positive intermediate conductor 531, the current may travel through the third equivalent resistor 574, the second output conductor 536, and the fourth equivalent resistor 576 to reach the negative intermediate conductor 533. The current may then travel from the negative intermediate conductor 533, through the negative crossover wire 539, to reach the negative input conductor 532.

The proportion of current through each of the two conduction paths 582, 584 depends on the relative resistances of the equivalent resistors 570 572, 574, 576. The resistances of the first and fourth equivalent resistors 570, 576 may be expected to change in a similar manner under strain, while the resistances of the second and third equivalent resistors 572, 574 change in the opposite manner under an opposing strain. For example, if the deformable member 420 is deflected as shown in FIG. 7, the first and fourth equivalent resistors 570, 576 may be under tension, and may therefore increase in resistance. Similarly, the second and third resistors 572, 574 may be under compression, and may decrease in resistance.

As a result, a comparatively greater portion of the electric current will travel through the second and third equivalent resistors 572, 574, or the second and third film sections 525, 526. Thus, some electric current may shunt from the second conduction path 584 to the first conduction path 582 via the output conductors 534, 536. The current may travel from the second output conductor 536 to the first output conductor 534, thereby producing an output signal readable by the output signal detector 50.

If the deformable member 420 were loaded in a manner opposite to that depicted in FIG. 7, i.e., such that the first and fourth film sections 524, 527 are in compression while the second and third film sections 525, 526 are in tension, shunting would occur in the opposite direction. More specifically, the first and fourth equivalent resistors 570, 576 would have comparatively low resistances, and current would shunt from the first output conductor 534 to the second output conductor 536 to move from the first conduction path 582 to the second conduction path 584.

Proper shunting may require that the resistances of the wires 52, 54, 538, 539 be low by comparison with the resistances of the equivalent resistors 570, 572, 574, 576. Furthermore, the crossover configuration of the first and negative crossover wires 538, 539 enables shunting such that the resistance differences of the first and second unitary film portions 528, 529 have an additive effect on the output signal. If the first and second unitary film portions 528, 529 were connected straight across by, for example, coupling the positive input conductor 530 with the negative intermediate conductor 533 and coupling the negative input conductor 532 with the positive intermediate conductor 531, the resistance differentials of the first and second unitary film portions 528, 529 would negate each other. Little or no shunting would occur between the first and second conduction paths 582, 584; thus, the output signal would be either very small or nonexistent.

One or more ground conductors 586 may also be used to reduce electrical interference with the operation of the microstrain sensor 510. In FIG. 8, two such ground conductors 586 are disposed on either side of the microstrain sensor 510. Each ground conductor 586 is shown attached to the deformable member 420, rather than to the insulator 22. The ground conductors 586 may be connected to any other member through which electric currents from the deformable member 420 can be dissipated.

As mentioned previously, the microstrain sensor 510 shown in FIG. 8 provides a full bridge design, with four equivalent resistors 570, 572, 574, 576, each of which has a resistance that varies according to the configuration of the deformable member 420. However, a half-bridge configuration could easily be provided by omitting or disconnecting some of the components of FIG. 8. For example, the second unitary film portion 529 may be omitted, along with the first and negative crossover wires 538, 539. The second output wire 54 may then be connected to the ground, so that the output signal detector 50 simply measures current shunting from the first conduction path 582 to the ground.

The comparative resistances of the first and second equivalent resistors 570, 572 would then determine how much current would shunt from the first conduction path 582. For example, in the loading configuration of FIG. 8, the resistance of the first equivalent resistor 570 may be high compared to that of the second equivalent resistor 572, for the reasons described previously. Thus, a comparatively smaller amount of current may shunt to the ground because the second equivalent resistor 572 provides a relatively low resistance path from the first output conductor 534 to the negative input conductor 532.

Like the full bridge design, the half bridge design provides a relatively accurate signal despite the opposing strains of the first and second halves 442, 444 of the deformable member 420. However, the full bridge design may have some advantages over the half bridge. For example, the full bridge may provide an output signal with a greater amplitude (gain), and may provide thermal compensation, in a manner similar to that described in connection with previous embodiments. Other benefits, such as compensation for torsion, may also be obtained through the use of the full bridge design.

In operation, it may be desirable to use the microstrain sensor 510 in combination with a circuit board condition the input and output signals. Additionally, a housing may be helpful in eliminating interference from dust or other particulate matter. Such additional features will be described in greater detail in connection with FIG. 9.

Figure 9:
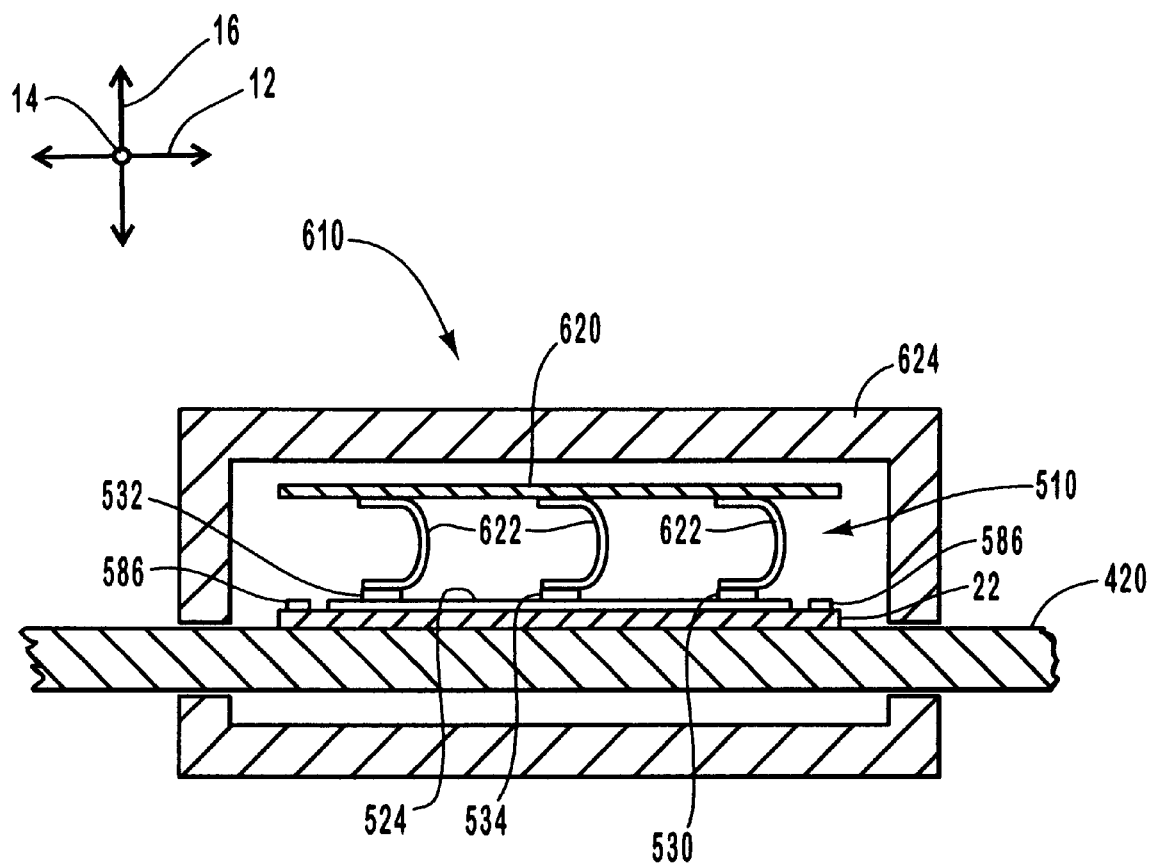
FIG. 9 is a side section view of a portion of the dually constrained deformable member of FIG. 7 with a sensor assembly including a printed circuit board electrically coupled to the microstrain sensor of FIG. 7 to provide the electrical connections depicted in FIG. 8.

Referring to FIG. 9, a cross sectional view shows of a portion of the deformable member 420 with one embodiment of a sensor assembly 610 attached to the deformable member 420 to provide strain measurement. The sensor assembly 610 incorporates the microstrain sensor 510 of FIGS. 7 and 8. The sensor assembly may also include a printed circuit board 620 that has components necessary to condition the input and output signals.

The printed circuit board 620 may include, or may be directly coupled to, the input signal source 40 and the output signal detector 50. The printed circuit board 620 may also include crossover circuitry that carries out the function of the first and negative crossover wires 538, 539 of FIG. 8, e.g., connecting the positive input conductor 530 with the positive intermediate conductor 531 and connecting the negative input conductor 532 with the negative intermediate conductor 533.

The printed circuit board 620 may be connected to the microstrain sensor 510 through the use of a plurality of connectors 622, each of which may be disposed in contact with one of the conductors 530, 531, 532, 533, 534, 536. The connectors 622 may take the form of metallic supports that are stiff enough to keep the printed circuit board 620 away from the microstrain sensor 510, yet flexible enough to permit deformation of the deformable member 420. The connectors 622 may, for example, comprise "gull wing" type connectors.

In the alternative, the connectors 622 may be any other type of electrical coupling, such as flexible wires or the like. The printed circuit board 620 may be held in place by some other type of connector, that attaches the printed circuit board 620 to the microstrain sensor 510, the deformable member 420, and/or a housing 624 of the microstrain sensor. For example, if flexible wiring is used to form the connectors 622, stiffer connectors such as gull wing type connectors may be used to attach the ground conductors 586 to the printed circuit board 620. As another alternative, the housing 624 may be filled with an insulative gel to maintain separation between the microstrain sensor 510 and the printed circuit board 620.

The housing 624 may substantially enclose the printed circuit board 620 and the microstrain sensor 510, with the exception of any input and/or output wiring. Thus, the microstrain sensor 510 and the printed circuit board 620 may be protected from dust or other contaminants. The housing 624 may also provide some degree of electrical and/or magnetic isolation. The housing 624 may be somewhat flexible to accommodate deformation of the deformable member 420.

The housing 624, printed circuit board 620, and connectors 622 may be adapted to suit any microstrain sensor configuration. For example, a microstrain sensor 10 or 110 may be used in conjunction with the housing 624, printed circuit board 620, and connectors 622 by simply rearranging the connectors 622 and altering the circuit of the printed circuit board 620 to suit the operation of the microstrain sensor 10 or 110.

As mentioned previously, film sections need not be unitary like the first and second film sections 524, 525 of FIG. 8, but may be separated on opposite sides of the central plane 440. In such a configuration, circuitry may be formed directly on a microstrain sensor to connect separate film sections. An example of such a configuration will be shown and described in connection with FIG. 10.

Figure 10:
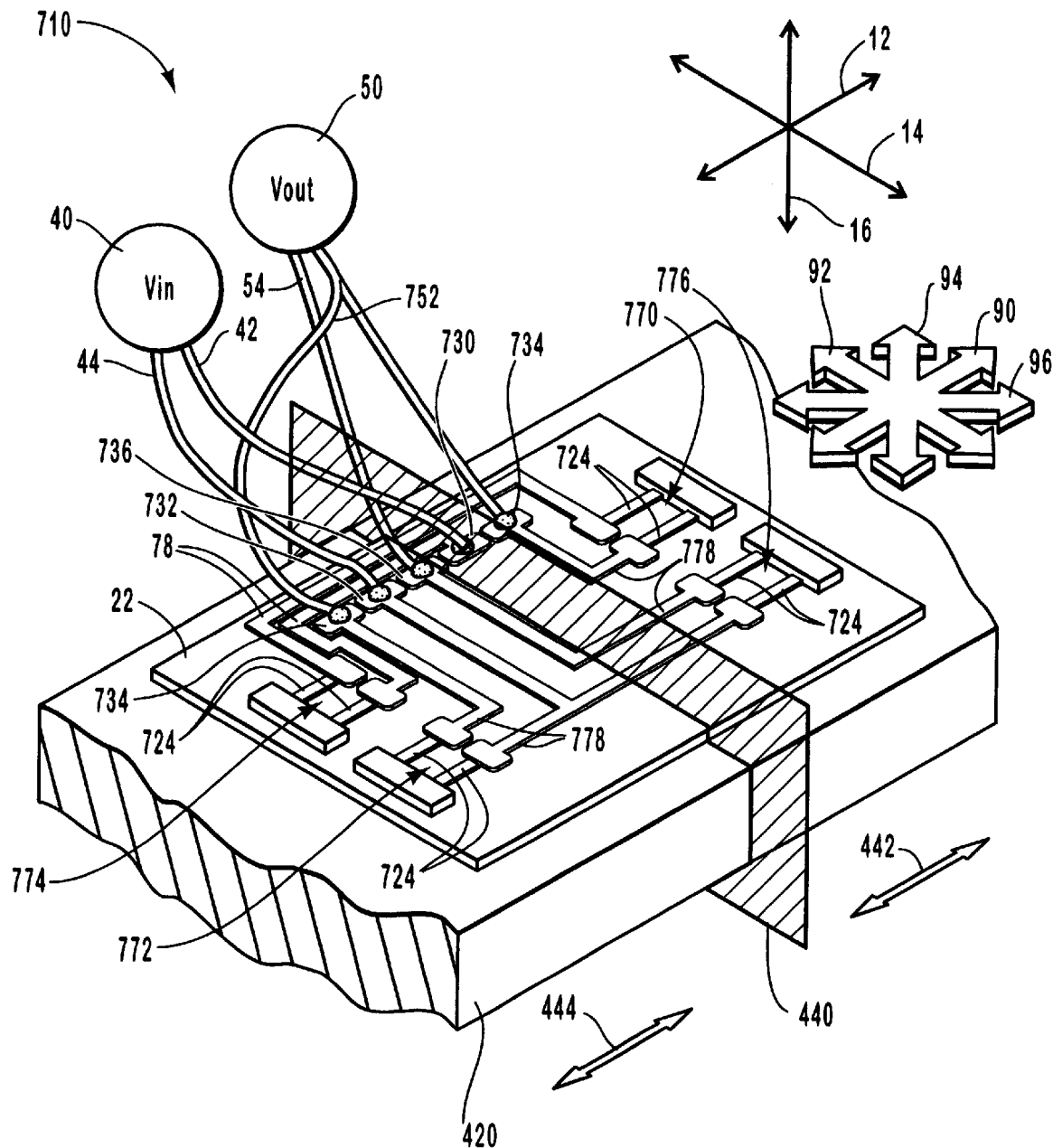
FIG. 10 is a perspective view of another embodiment of a microstrain sensor configured to measure strain in the presence of opposing stresses, attached to the dually constrained deformable member of FIG. 7.

Referring to FIG. 10, an alternative embodiment of a microstrain sensor 710 is shown, for use with a deformable member 420 in which opposing strains are present. The microstrain sensor 710 may have a plurality of film sections 724 disposed in symmetrical fashion on opposite sides of the central plane 440, on an insulator 22. Although a half bridge may be created using only two such film sections 724, the microstrain sensor 710 of FIG. 10 uses eight film sections 724 to provide a full bridge with additional output signal amplitude.

The microstrain sensor 710 may also have a positive input conductor 730, a negative input conductor 732, a first pair of output conductors 734, and a second output conductor 736. The conductors 730, 732, 734, 736 may be arrayed along the insulator 22, rather than disposed directly on the film sections 724. The conductors 730, 732, 734, 736 may be positioned generally between the film sections 724. As with previous embodiments, the input conductors 730, 732 may be coupled to an input signal source 40 through the use of a positive input wire 42 and a negative input wire 44.

The first pair of output conductors 734 may be coupled to an output signal detector 50 through the use of a first output wire 752, which splits into two parts to connect to both conductors of the first pair of output conductors 734. The first pair of output conductors 734 may function as a single conductor for purposes of circuit analysis because the first output wire 752 can be assumed to have a negligible resistance. The first pair of output conductors 734 may simply be located separately to connect to film sections 724 on either side of the central plane 440 without interfering with the other conductors 730, 732, 736. The second output conductor 736 may be coupled to the output signal detector 50 by a second output wire 54.

The film sections 724 may be grouped together in pairs to form a first equivalent resistor 770, a second equivalent resistor 772, a third equivalent resistor 774, and a fourth equivalent resistor 776. Like the microstrain sensor 510 of FIG. 8, the first and fourth equivalent resistors 770, 776 are positioned on the first half 442 of the deformable member 420, and the second and third equivalent resistors 772, 774 are positioned on the second half 444 of the deformable member 420. Consequently, the resistances of the first and fourth equivalent resistors 770, 776 change in tandem, and the resistances of the second and third equivalent resistors 772, 774 change in tandem.

The film sections 724 may be electrically coupled by traces 778 formed on the insulator 22. For example, the traces 778 may be formed of a highly conductive, metallic material such as silver. The traces 778 may coupled in such a manner that an electric circuit similar to that of the microstrain sensor 510 of FIG. 8 is formed. Thus, the first and second equivalent resistors 770, 772 are both electrically coupled directly to the first pair of output conductors 734, and the third and fourth equivalent resistors 774, 776 are both electrically coupled directly to the second output conductor 736.

Consequently, the traces 778 provide crossover circuitry to ensure that the resistance differential between the first and second equivalent resistors 770, 772 is not negated by the resistance differential between the third and fourth equivalent resistors 774, 776. The traces 778 may thus perform some of the functions of the printed circuit board 620. However, the microstrain sensor 710 may also be used in conjunction with a printed circuit board, housing, and connectors like the printed circuit board 620, housing 624, and connectors 622 of FIG. 9.

The accuracy of the microstrain sensor 710 may be adversely affected by the asymmetry of the traces 778, which can be expected to have some electrical resistance. Such effects can be minimized by increasing the symmetry of the layout of the traces 778, structuring the traces 778 to have a negligible resistance, and/or processing the output signal to remove any artifacts resulting from the asymmetry. The microstrain sensor 710 may have a comparatively high output signal amplitude due to the positioning of the film sections 724 away from the central plane 440; since strains are larger away from the central plane 440, the film sections 724 would undergo a larger deformation. Increasing the distance between the film sections 724 and the central plane 440 may further increase the amplitude of the output signal.

The configuration depicted in FIG. 10 is only one example of microstrain sensors in which multiple film sections are electrically coupled by circuitry disposed on the deformable member. Those of skill in the art will recognize that different numbers of film sections may be used with a wide variety of trace and conductor configurations. Microstrain sensors such as the microstrain sensors 510, 710 of FIGS. 8 and 10 may be incorporated into automotive applications in ways similar to those shown and described in connection with FIGS. 3 through 6. In particular, one or more of the microstrain sensors 510, 710 may be effectively utilized to measure weight-in-seat, in a manner similar to the sensor 322.

Any of the microstrain sensors 10, 110, 510, 710 shown and described herein may have greater accuracy when the film is applied with a uniform thickness. The electrical resistance of a member has an inverse relationship to the cross sectional area through which the current must travel. Consequently, in order to ensure that the resistance of the film varies uniformly from one part of the film to the next, the film should have a uniform thickness.

Unfortunately, when a film is applied over a surface with abrupt irregularities, the film may tend to settle somewhat to create smooth transitions, thereby producing thinner regions of the film. These thinner regions effectively have a higher electrical resistance than the surrounding regions of the film. As a result, the change in resistance of the film varies in a somewhat unpredictable manner.

Furthermore, under tension, the film may pull away from any features jutting from the surface on which the film is formed. As a gap is created between the film and a jutting feature, the resistance of the coupling between the film and the jutting feature increases dramatically, thereby making the resistance of the film change in an erratic and nonlinear manner when the film is in tension.

In the context of microstrain sensors, such problems may occur when the conductors are positioned prior to formation of the film. The conductors create irregularities on the surface of an insulator; thus, when the film is applied over the conductors, the problems described above may occur.

Consequently, it may be beneficial to apply the film before positioning the conductors. The film may be applied over a comparatively flat, even surface so that the film has a relatively uniform cross section. The conductors may then be placed on the film without significantly changing the thickness of any part of the film. The conductors may thus be deposited, bonded, or otherwise attached to the film in such a way that the conductors need not be pressed into the film with a force large enough to significantly compress the film.

The microstrain sensor 510 of FIG. 8 depicts such a configuration. The conductors 530, 531, 532, 533, 534, 536 are shown on top of the unitary film portions 528, 529. Each of the unitary film portions 528, 529 is therefore substantially rectangular prismoidal in shape, so that a uniform cross section exists. When the unitary film portions 528, 529 elongate or shorten, the resistance increases substantially uniformly along the whole length of the unitary film portions 528.

If desired, a similar processing order may be used with any of the other microstrain sensors 10, 110, 710 of the present invention. An insulator may first be applied on the deformable member, and a film may be applied directly to the insulator, with a comparatively uniform thickness. Conductors may then be disposed on top of the film without significantly altering the cross section of any part of the film. Geometry and material considerations may dictate whether such a processing order is possible or desirable.

The systems and methods of the present invention provide numerous advantages over the prior art. The microstrain sensors 10, 110 provide versatile, robust strain measurement with a high resistance to temperature gradients, physical wear, and other conditions that can degrade the accuracy of traditional strain gauges. The shared-resistance design of the microstrain sensors 10, 110 makes manufacture and installation of the microstrain sensors 10, 110 inexpensive, easy, and well suited to mass production environments.

Furthermore, the automotive safety system 310 enhances the safety and comfort of vehicle occupants 314 by obtaining accurate operational data and controlling the various safety elements 315, 319 of the automotive safety system 310 accordingly. Operation of the automotive safety system 310 may be further enhanced through the use of the microstrain sensors 10, 110. Acceleration, weight-in-seat, frame deformation, seat belt tension, and any other desired parameter may be used to improve driving safety through the use of the automotive safety system 310.

Yet further, the seat belt buckle assembly 362 of the present invention provides an indication of the latch/unlatch condition of the seat belt buckle assembly 362, as well as an accurate measurement of the tension in the seat belt 315 with the use of a single sensor 320 that can be retrofitted to existing seat belts with comparative ease. Through the use of a microstrain sensor 10 to form the sensor 320, the seat belt buckle assembly 362 can be made with a minimum of expense and labor.

Moreover, through the use of microstrain sensors such as the microstrain sensors 510, 710 of FIGS. 8 and 10, strains can be measured in deformable members in which opposing strains are present. Deformation of members such as fixed-guided members may be measured despite the fact that the strains reverse directions across the center of the member.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A microstrain sensor configured to detect a present configuration of a deformable member, the microstrain sensor comprising:
   a film comprising an at least partially electrically conductive material attached to the deformable member such that the film deforms in tandem with the deformable member;
   a positive input conductor in contact with the film;
   a negative input conductor in contact with the film, the negative input conductor cooperating with the positive input conductor to provide an input signal through the film;
   a first output conductor in contact with the film; and
   a second output conductor in contact with the film, the second output conductor cooperating with the first output conductor to receive an output signal from the film, the output signal corresponding to the present configuration of the deformable member;
   wherein the input and output conductors are non-integrally formed with respect to the film.

2. The microstrain sensor of claim 1, wherein the conductors are arrayed around a current-carrying portion of the film so that the input conductors are on opposite sides of the current-carrying portion and the output conductors are on opposite sides of the current-carrying portion, the conductors forming a first conduction path through the film from the positive input conductor to the first output conductor and from the first output conductor to the negative input conductor, the conductors also forming a second conduction path through the film from the positive input conductor to the second output conductor and from the second output conductor to the negative input conductor.

3. The microstrain sensor of claim 2, wherein the first conduction path has a resistance substantially equal to a resistance of the second conduction path.

4. The microstrain sensor of claim 3, wherein the conductors are arrayed as points of a square around the current-carrying portion of the film.

5. The microstrain sensor of claim 2, wherein the conductors are oriented to measure deformation along a longitudinal axis of the deformable member.

6. The microstrain sensor of claim 2, wherein the conductors are oriented to measure deformation along a torsional axis of the deformable member.

7. The microstrain sensor of claim 1, further comprising an insulator formed of a material having a high electrical resistivity, wherein the insulator is disposed between the deformable member and the film.

8. The micro strain sensor of claim 1, wherein the film comprises a thick film applied through a screening process.

9. The microstrain sensor of claim 1, wherein the deformable member is disposed within a buckle of a seat belt buckle assembly, the deformable member being configured to deform in response to a magnitude of a tensile force tending to withdraw a latch plate from the buckle.

10. The microstrain sensor of claim 1, wherein the deformable member is connected to a seat of an assembly, the deformable member being configured to deform in response to a magnitude of a weight of an occupant of the seat.

11. The microstrain sensor of claim 1, wherein the deformable member is connected to a belt member of a seat belt, the deformable member being configured to deform in proportion to a magnitude of a tensile force on the belt member, wherein the deformable member is more rigid than the belt member.

12. The microstrain sensor of claim 1, wherein the deformable member is configured as part of a frame of a vehicle, the deformable member being further configured to deform in response to a magnitude of a load on the frame.

13. The microstrain sensor of claim 1, wherein the deformable member is configured to deform in response to a magnitude of acceleration acting on a vehicle, the deformable member having a proximal portion affixed to the vehicle and a distal portion extending unrestrained.

14. A microstrain sensor configured to detect a present configuration of a deformable member, the microstrain sensor comprising:
   a first film portion comprising an at least partially electrically conductive material attached to the deformable member such that the film deforms in tandem with the deformable member, wherein the first film portion is constructed of a thick film;
   a positive input conductor in contact with the film;
   a negative input conductor in contact with the film, the negative input conductor cooperating with the positive input conductor to provide an input signal through a first conduction path in the film; and
   a first output conductor disposed along the conduction path to receive at least a portion of the input signal to provide an output signal corresponding to the present configuration of the deformable member;
   wherein the input and output conductors are non-integrally formed with respect to the film.

15. The microstrain sensor of claim 14, further comprising a second output conductor disposed along a second conduction path in the first film portion.

16. The microstrain sensor of claim 15, wherein the conductors are oriented to measure deformation along a longitudinal axis of the deformable member.

17. The microstrain sensor of claim 15, wherein the conductors are oriented to measure deformation along a torsional axis of the deformable member.

18. The microstrain sensor of claim 14, further comprising an insulator formed of a material having a high electrical resistivity, wherein the insulator is disposed between the deformable member and the first film portion.

19. The microstrain sensor of claim 14, wherein the first film portion comprises a thick film applied through a screening process.

20. The microstrain sensor of claim 14, wherein the first film portion is attached at a location and orientation such that the output conductor is positioned proximate a central plane separating the deformable member into two halves, wherein the input conductors are disposed substantially equidistant from the central plane to provide measurement of the deformable member in a dually constrained configuration.

21. The microstrain sensor of claim 20, further comprising a second film portion attached parallel to first film portion, the second film portion comprising:
   a first intermediate conductor aligned with the negative input conductor;
   a second intermediate conductor aligned with the positive input conductor; and a second output conductor aligned with the first output conductor.

22. The microstrain sensor of claim 21, wherein the first intermediate conductor is electrically coupled to the positive input conductor, and wherein the second intermediate conductor is electrically coupled to the negative input conductor.

23. A microstrain sensor configured to provide an output signal corresponding to a present configuration of a deformable member with two constrained ends, the deformable member having a first half and a second half separated from the first half by a central plane disposed substantially halfway between the two constrained ends, the microstrain sensor comprising:

a first film section comprising an at least partially electrically conductive material disposed on the first half of the deformable member;

a second film section comprising an at least partially electrically conductive material disposed on the second half of the deformable member, substantially coplanar with the first film section, wherein the second film section is positioned such that the central plane is disposed substantially halfway between the first and second film sections;

a plurality of conductors electrically coupled to the first and second film sections such that an increase in resistance in the first film section cooperates with a decrease in resistance in the second film section to provide an additive effect on the output signal;

wherein the conductors are non-integrally formed with respect to the film.

24. The microstrain sensor of claim 23, wherein the first and second film sections are joined to form a first unitary film portion extending through the central plane.

25. The microstrain sensor of claim 24, further comprising:

a third film section disposed on the second half of the deformable member; and a fourth film section disposed on the first half of the deformable member, wherein the third and fourth film sections are joined to form a second unitary film portion extending through the central plane.

26. The microstrain sensor of claim 25, wherein the plurality of conductors comprises:

a pair of input conductors disposed on the first unitary film portion;

a first output conductor disposed on the first unitary film portion between the input conductors;

a pair of intermediate conductors disposed on the second unitary film portion; and a second output conductor disposed on the second unitary film portion between the intermediate conductors.

27. The microstrain sensor of claim 26, further comprising crossover circuitry disposed to electrically connect one of the input conductors on the first half with one of the intermediate conductors on the second half, and to connect one of the input conductors on the second half with one of the intermediate conductors on the first half.

28. The microstrain sensor of claim 23, wherein the first and second film sections are separate from each other, and wherein the first and second film sections are electrically coupled to the conductors by metallic traces.

29. The microstrain sensor of claim 28, further comprising:

a third film section disposed on the second half of the deformable member; and a fourth film section disposed on the first half of the deformable member, wherein the third and fourth film sections are electrically coupled to the conductors by the metallic traces such that an increase in resistance in the fourth film section cooperates with a decrease in resistance in the third film section to provide an additive effect on the output signal.

30. A method of sensing a present configuration of a deformable member, the method comprising:

attaching a film comprising an at least partially electrically conductive material to the deformable member so that the film deforms in tandem with the deformable member, the film having two input nodes and two output nodes, each node of the output nodes being displaced from each node of the input nodes such that the film defines a current-carrying portion;

applying an input signal to the film through the input nodes; and receiving an output signal from the film through the output nodes, the output signal corresponding to the present configuration of the deformable member.

31. The method of claim 30, wherein the nodes are arrayed around a current-carrying portion of the film so that the input nodes are on opposite sides of the current-carrying portion and the output nodes are on opposite sides of the current-carrying portion.

32. The method of claim 31, further comprising orienting the input nodes and output nodes to measure deformation along a longitudinal axis of the deformable member.

33. The method of claim 31, further comprising orienting the input nodes and output nodes to measure deformation along a torsional axis of the deformable member.

34. The method of claim 30, further comprising:

attaching two input conductors to the two input nodes to apply the input signal; and attaching two output conductors to the two output nodes to receive the output signal.

35. The method of claim 34, further comprising affixing an insulator directly to the deformable member to restrict current flow between the film and the deformable member.

36. The method of claim 30, wherein attaching the film comprises utilizing a screening process to apply a thick film on the deformable member.

* * * * *